US 7,668,657 B2

(12) United States Patent
Fenton

(10) Patent No.: US 7,668,657 B2
(45) Date of Patent: *Feb. 23, 2010

(54) SEISMIC MEASURING SYSTEM INCLUDING GPS RECEIVERS

(75) Inventor: Patrick C. Fenton, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/835,520

(22) Filed: Aug. 8, 2007

(65) Prior Publication Data

US 2007/0268176 A1    Nov. 22, 2007

Related U.S. Application Data

(63) Continuation of application No. 11/502,086, filed on Aug. 10, 2006, now Pat. No. 7,526,386, which is a continuation of application No. 10/891,800, filed on Jul. 15, 2004, now Pat. No. 7,117,094.

(51) Int. Cl.
*G01V 1/00* (2006.01)
*G01S 1/00* (2006.01)

(52) U.S. Cl. .................................. 702/14; 342/357.12

(58) Field of Classification Search ................... 702/14, 702/5, 16, 1, 2, 150–153, 155, 158, 159; 340/686.1, 690, 540; 342/118, 125, 127, 342/352, 357.01, 357.06, 357.09, 357.12, 342/357.15, 128, 357.04, 357.16, 358
See application file for complete search history.

(56) References Cited

U.S. PATENT DOCUMENTS

| | | | |
|---|---|---|---|
| 4,589,100 A | | 5/1986 | Savit |
| 4,894,662 A | * | 1/1990 | Counselman ........... 342/357.12 |
| 5,252,982 A | * | 10/1993 | Frei ....................... 342/357.03 |
| 5,552,794 A | * | 9/1996 | Colley et al. ........... 342/357.05 |
| 5,583,513 A | * | 12/1996 | Cohen .................... 342/357.06 |

(Continued)

FOREIGN PATENT DOCUMENTS

WO    WO 01/55747 A1    8/2001

OTHER PUBLICATIONS

Duff et al., Structural Deformation Monitoring With GPS: Operational Issues, 1998, SPIE vol. 3400, pp. 422-432.*

(Continued)

*Primary Examiner*—Michael P. Nghiem
*Assistant Examiner*—Toan M Le
(74) *Attorney, Agent, or Firm*—Cesari and McKenna, LLP; Patricia A. Sheehan

(57) ABSTRACT

A system for determining positions of fixed-position GPS receives that have restricted views of the sky includes a data recording and control center, and one or more base GPS receivers with associated antennas with a substantially unrestricted views of the sky. The system batch processes range information provided by the fixed-position GPS receivers over an extended period of time; determining which of the range data from the fixed-position receivers are valid, and using the valid range data to determine position. In this way, the precise positions of the respective fixed-position slave GPS receivers can be calculated, even if the fixed-position GPS receivers are able to observe and collect data from sets of two or more satellites for only three or four relatively short time intervals at various sky positions during the extended period.

17 Claims, 2 Drawing Sheets

U.S. PATENT DOCUMENTS

| | | | |
|---|---|---|---|
| 5,724,241 | A | 3/1998 | Wood et al. |
| 5,781,156 | A | 7/1998 | Krasner |
| 5,822,273 | A | 10/1998 | Bary et al. |
| 5,828,336 | A | 10/1998 | Yunck et al. |
| 5,978,313 | A | 11/1999 | Longaker |
| 6,002,640 | A | 12/1999 | Harmon |
| 6,067,852 | A | 5/2000 | Alber et al. |
| 6,140,957 | A | 10/2000 | Wilson et al. |
| 6,188,962 | B1 | 2/2001 | Morgan et al. |
| 6,219,620 | B1 | 4/2001 | Park et al. |
| 6,553,316 | B2 | 4/2003 | Bary et al. |
| 6,728,637 | B2 | 4/2004 | Ford et al. |
| 6,847,896 | B1 | 1/2005 | Orban et al. |
| 6,944,096 | B2 | 9/2005 | Lemenager et al. |
| 6,975,266 | B2 * | 12/2005 | Abraham et al. ........ 342/357.02 |
| 7,117,094 | B2 * | 10/2006 | Fenton ......................... 702/14 |
| 2004/0242585 | A1 | 12/2004 | Smith et al. |
| 2005/0027453 | A1 | 2/2005 | Fort et al. |
| 2005/0047275 | A1 | 3/2005 | Chamberlain et al. |
| 2007/0198207 | A1 * | 8/2007 | Heidebrecht ................ 702/152 |
| 2007/0213936 | A1 * | 9/2007 | Fenton et al. ................. 702/14 |

OTHER PUBLICATIONS

Ray et al., GPS Code and Carrier Multipath Mitigation Using a Multiantenna System, Jan. 2001, IEEE Transactions on Aerospace and Electronic System, vol. 37, No. 1, pp. 183-195.*

Harigae M et al: "Control of Large Space Structures Using GPS-Modal Parameter Identification and Attitude and Deformation Estimation" Electronics & Communciations in Japan, Part I—Communications, Scripta Technica. New York, US vol. 4, part 1, No. 86, Apr. 2003, pp. 63-71.

Canadian Action No. 0601-08106, *Aram Systems Ltd.* v. *NovAtel Inc. and Patrick Fenton*, Statement of Claim, dated Jul. 6, 2006.

Canadian Action No. 0601-08106, *Aram Systems Ltd.* v. *NovAtel Inc. and Patrick Fenton*, Amended Statement of Claim, dated Dec. 21, 2006.

Canadian Action No. 0601-08106, *Aram Systems Ltd.* v. *NovAtel Inc. and Patrick Fenton*, Further Amended Statement of Claim, dated Sep. 11, 2007.

Canadian Action No. 0601-08106, *Aram Systems Ltd.* v. *NovAtel Inc. and Patrick Fenton*, Affidavit of Werner Gartner sworn Jul. 17, 2006 re: Rule 552 (2) of the Alberta Rules of Court, dated Jul. 17, 2006.

Canadian Action No. 0601-08106, *Aram Systems Ltd.* v. *NovAtel Inc. and Patrick Fenton*, Mandatory Injunction, Notice of Motion of ARAM Systems returnable Sep. 13, 2006, dated Aug. 14, 2006; Amended Notice of Motion of ARAM Systems returnable Sep. 12, 2006, dated Sep. 5, 2006.

Canadian Action No. 0601-08106, *Aram Systems Ltd.* v. *NovAtel Inc. and Patrick Fenton*, Affidavit of Virgil Barfield sworn Aug. 2, 2006, filed Aug. 14, 2006.

Canadian Action No. 0601-08106, *Aram Systems Ltd.* v. *NovAtel Inc. and Patrick Fenton*, Affidavit of David Heidebrecht sworn Aug. 11, 2006, dated Aug. 14, 2006.

Canadian Action No. 0601-08106, *Aram Systems Ltd.* v. *NovAtel Inc. and Patrick Fenton*, Affidavit of Michael O. Sutton (Expert) sworn Aug. 10, 2006, dated Aug. 14, 2006 (w/ Exhibits).

Canadian Action No. 0601-08106, *Aram Systems Ltd.* v. *NovAtel Inc. and Patrick Fenton*, Supplementary Affidavit of Michael O. Sutton (Expert) sworn Aug. 25, 2006 (w/ Exhibits).

Canadian Action No. 0601-08106, *Aram Systems Ltd.* v. *NovAtel Inc. and Patrick Fenton*, Affidavit of Jerald Harmon sworn Aug. 10, 2006, dated Aug. 14, 2006 (w/ Exhibits).

Canadian Action No. 0601-08106, *Aram Systems Ltd.* v. *NovAtel Inc. and Patrick Fenton*, Statement of Defence and Counterclaim, dated Aug. 25, 2006.

Canadian Action No. 0601-08106, *Aram Systems Ltd.* v. *NovAtel Inc. and Patrick Fenton*, Amended Statement of Defence and Amended Counterclaim, dated Apr. 12, 2007.

Canadian Action No. 0601-08106, *Aram Systems Ltd.* v. *NovAtel Inc. and Patrick Fenton*, Amended Amended Statement of Defence and Amended Amended Counterclaim, dated May 29, 2007.

Canadian Action No. 0601-08106, *Aram Systems Ltd.* v. *NovAtel Inc. and Patrick Fenton*, Amended Amended Amended Statement of Defence and Amended Amended Amended Counterclaim, dated Sep. 12, 2007.

Canadian Action No. 0601-08106, *Aram Systems Ltd.* v. *NovAtel Inc. and Patrick Fenton*, Summary Judgment, Notice of Motion of NovAtel returnable on Sep. 12, 2006, dated Aug. 25, 2007.

Canadian Action No. 0601-08106, *Aram Systems Ltd.* v. *NovAtel Inc. and Patrick Fenton*, Amended Notice of Motion of NovAtel returnable of Sep. 13, 2006, dated Aug. 28, 2007.

Canadian Action No. 0601-08106, *Aram Systems Ltd.* v. *NovAtel Inc. and Patrick Fenton*, Affidavit of Patrick C. Fenton sworn Aug. 25, 2006, dated Aug. 25, 2006.

Canadian Action No. 0601-08106, *Aram Systems Ltd.* v. *NovAtel Inc. and Patrick Fenton*, Affidavit of Nicholas Schubert sworn Aug. 25, 2006, dated Aug. 25, 2006.

Canadian Action No. 0601-08106, *Aram Systems Ltd.* v. *NovAtel Inc. and Patrick Fenton*, Affidavit of Farlin Halsey sworn Aug. 25, 2006, dated Aug. 25, 2006.

Canadian Action No. 0601-08106, *Aram Systems Ltd.* v. *NovAtel Inc. and Patrick Fenton*, Affidavit of David M. Quinlan (Expert) sworn Aug. 25, 2006, dated Aug. 25, 2006.

Canadian Action No. 0601-08106, *Aram Systems Ltd.* v. *NovAtel Inc. and Patrick Fenton*, Cases Referred to in the Affidavit of David M. Quinlan Sworn Aug. 25, 2006.

Canadian Action No. 0601-08106, *Aram Systems Ltd.* v. *NovAtel Inc. and Patrick Fenton*, Cross-examination taken Aug. 29, 2006 on Affidavit of David Heidebrecht sworn Aug. 11, 2006.

Canadian Action No. 0601-08106, *Aram Systems Ltd.* v. *NovAtel Inc. and Patrick Fenton*, Cross-examination taken Aug. 30, 2006 on Affidavit of Patrick C. Fenton sworn Aug. 25, 2006.

Canadian Action No. 0601-08106, *Aram Systems Ltd.* v. *NovAtel Inc. and Patrick Fenton*, Cross-examination taken Aug. 30, 2006 on Affidavit of Jerald Harmon sworn Aug. 10, 2006.

Canadian Action No. 0601-08106, *Aram Systems Ltd.* v. *NovAtel Inc. and Patrick Fenton*, Cross-examination taken Aug. 31, 2006 on Affidavit of David Quinlan sworn Aug. 25, 2006.

Canadian Action No. 0601-08106, *Aram Systems Ltd.* v. *NovAtel Inc. and Patrick Fenton*, Cross-examination taken Sep. 1, 2006 on Affidavits of Michael Sutton sworn August 14 and Aug. 25, 2006.

Canadian Action No. 0601-08106, *Aram Systems Ltd.* v. *NovAtel Inc. and Patrick Fenton*, Cross-examination taken Sep. 4, 2006 on Affidavit of Norbert Schubert sworn Aug. 25, 2006.

Canadian Action No. 0601-08106, *Aram Systems Ltd.* v. *NovAtel Inc. and Patrick Fenton*, Mandatory Injunction, Brief of Aram Systems to be heard by Special Application on Sep. 12, 2006 at 9:00 a.m. before the Honourable Madame Justice B.E.C. Romaine, dated Sep. 8, 2006.

Canadian Action No. 0601-08106, *Aram Systems Ltd.* v. *NovAtel Inc. and Patrick Fenton*, Injunction, Plaintiff's (Moving Party's) Book of Exhibits to Cross-Examinations, dated Sep. 8, 2006.

Canadian Action No. 0601-08106, *Aram Systems Ltd.* v. *NovAtel Inc. and Patrick Fenton*, Summary Judgment, Brief of Respondents (Aram Systems, Heidebrecht and Chamberlain) Special Application of Sep. 12, 2006 at 10:00 a.m. before the Honourable Madame Justice B.E.C. Romaine, dated Sep. 8, 2006.

Canadian Action No. 0601-08106, *Aram Systems Ltd.* v. *NovAtel Inc. and Patrick Fenton*, Summary Judgment, Supplemental Affidavit of Patrick C. Fenton sworn Sep. 12, 2006.

Canadian Action No. 0601-08106, *Aram Systems Ltd.* v. *NovAtel Inc. and Patrick Fenton*, Injunction and Summary Judgment, Written Brief of NovAtel Inc. and Patrick C. Fenton for the Special Chambers Application scheduled for Sep. 12, 2006 at 9:00 a.m. re: Order striking Statement of Claim (Limitations Act) and/or dismiss Plaintiff's motion for interim mandatory relief, dated Sep. 8, 2006.

Canadian Action No. 0601-08106, *Aram Systems Ltd.* v. *NovAtel Inc. and Patrick Fenton*, Book of Authorities of NovAtel and Patrick C. Fenton for the Special Chambers Application scheduled for Sep. 12, 2006, dated Sep. 8, 2006.

Canadian Action No. 0601-08106, *Aram Systems Ltd.* v. *NovAtel Inc. and Patrick Fenton*, Book of Exhibits to Cross-Examinations of NovAtel Inc. and Patrick C. Fenton, Special Chambers Application—Sep. 12, 2006.

Canadian Action No. 0601-08106, *Aram Systems Ltd.* v. *NovAtel Inc. and Patrick Fenton*, Excerpts from Cross-Examinations Relied Upon by NovAtel Inc. and Patrick C. Fenton, Special Chambers Application—Sep. 12, 2006.

Canadian Action No. 0601-08106, *Aram Systems Ltd.* v. *NovAtel Inc. and Patrick Fenton*, Cross-examination taken Sep. 15, 2006 on Affidavit of Patrick Fenton sworn, dated Sep. 15, 2006.

Canadian Action No. 0601-08106, *Aram Systems Ltd.* v. *NovAtel Inc. and Patrick Fenton*, Affidavit of Richard P. Bauer sworn Sep. 18, 2006, dated Sep. 20, 2006.

Canadian Action No. 0601-08106, *Aram Systems Ltd.* v. *NovAtel Inc. and Patrick Fenton*, Supplemental Affidavit of Richard P. Bauer sworn Sep. 18, 2006, dated Sep. 20, 2006.

Canadian Action No. 0601-08106, *Aram Systems Ltd.* v. *NovAtel Inc. and Patrick Fenton*, Affidavit of Harry F. Manbeck, Jr. sworn Sep. 20, 2006.

Canadian Action No. 0601-08106, *Aram Systems Ltd.* v. *NovAtel Inc. and Patrick Fenton*, Supplemental Affidavit of David M. Quinlan sworn Sep. 20, 2006.

Canadian Action No. 0601-08106, *Aram Systems Ltd.* v. *NovAtel Inc. and Patrick Fenton*, Summary Judgment, Plaintiff's Further Book of Exhibits to Cross-Examination of Patrick C. Fenton, dated Sep. 20, 2006.

Canadian Action No. 0601-08106, *Aram Systems Ltd.* v. *NovAtel Inc. and Patrick Fenton*, Supplementary Written Brief of NovAtel Inc. and Patrick C. Fenton on the Issues Raised in the Affidavit Evidence filed on Sep. 20, 2006, dated Sep. 25, 2006.

Canadian Action No. 0601-08106, *Aram Systems Ltd.* v. *NovAtel Inc. and Patrick Fenton*, Injunction, Supplemental Brief of Aram Systems re: Plaintiff's Motion for Interim Mandatory Injunction before the Honourable Madame Justice B.E.C. Romaine, dated Sep. 25, 2007.

Canadian Action No. 0601-08106, *Aram Systems Ltd.* v. *NovAtel Inc. and Patrick Fenton*, Summary Judgment, Supplemental Brief of Aram Systems re: NovAtel's Application for Summary Judgment, dated Sep. 25, 2006.

Canadian Action No. 0601-08106, *Aram Systems Ltd.* v. *NovAtel Inc. and Patrick Fenton*, Summary Judgment, Supplementary Written Brief of NovAtel Inc. and Patrick C. Fenton with respect to the Application for Summary Judgment, dated Sep. 25, 2006.

Canadian Action No. 0601-08106, *Aram Systems Ltd.* v. *NovAtel Inc. and Patrick Fenton*, Reply by Aram Systems Ltd. to Statement of Defence and Defence to Counterclaim, dated Sep. 25, 2006.

Canadian Action No. 0601-08106, *Aram Systems Ltd.* v. *NovAtel Inc. and Patrick Fenton*, Amended Reply by Aram Systems Ltd. to Amended Amended Statement of Defence, dated Jun. 15, 2007.

Canadian Action No. 0601-08106, *Aram Systems Ltd.* v. *NovAtel Inc. and Patrick Fenton*, Further Amended Reply by Aram Systems Ltd. to Amended Amended Amended Statement of Defence. Dated Sep. 17, 2007.

Canadian Action No. 0601-08106, *Aram Systems Ltd.* v. *NovAtel Inc. and Patrick Fenton*, Reasons for Judgment of Madame Justice B.E.C. Romaine dated Sep. 28, 2006.

Canadian Action No. 0601-08106, *Aram Systems Ltd.* v. *NovAtel Inc. and Patrick Fenton*, Civil Notice of Appeal of Madame Justice Romain's Order of Sep. 28, 2006 refusing to grant an interim mandatory order.

Canadian Action No. 0601-08106, *Aram Systems Ltd.* v. *NovAtel Inc. and Patrick Fenton*, Injunction, Court of Appeal—Notice of Motion of Aram Systems before Justice O'Brien returnable on Sep. 28, 2006 seeking an Order permitting and directing a single judge of the Court of Appeal hear an application returnable Sep. 29, 2006 for interim relief against NovAtel Inc. and Patrick Fenton pending the hearing of the appeal of Madame Justice Romaine's Order dated Sep. 28, 2006.

Canadian Action No. 0601-08106, *Aram Systems Ltd.* v. *NovAtel Inc. and Patrick Fenton*, Injunction, Court of Appeal—Notice of Motion of Aram Systems returnable on Sep. 29, 2006 seeking an Order confirming a single judge has jurisdiction to hear this application and seeking interim relief against NovAtel Inc. and Patrick Fenton pending the hearing of the appeal of Madame Justice Romaine's Order dated Sep. 28, 2006; filed Sep. 28, 2006.

Canadian Action No. 0601-08106, *Aram Systems Ltd.* v. *NovAtel Inc. and Patrick Fenton*, Injunction, Court of Appeal—Authorities before the Honourable Mr. Justice O'Brien.

Canadian Action No. 0601-08106, *Aram Systems Ltd.* v. *NovAtel Inc. and Patrick Fenton*, Injunction, Court of Appeal—Brief of NovAtel Inc. and Patrick C. Fenton to the Motion of Aram Systems Inc. for a Hearing for a Stay, dated Sep. 28, 2006.

Canadian Action No. 0601-08106, *Aram Systems Ltd.* v. *NovAtel Inc. and Patrick Fenton*, Injunction, Court of Appeal—Submissions of the Respondents NovAtel Inc. and Patrick C. Fenton to the Motion of Aram Systems Inc. for a Stay—Hearing before the Honourable Mr. Justice C.D. O'Brien on Sep. 29, 2006 at 2:30 p.m.

Canadian Action No. 0601-08106, *Aram Systems Ltd.* v. *NovAtel Inc. and Patrick Fenton*, Injunction, Court of Appeal—Additional Authorities of NovAtel Inc. and Patrick C. Fenton to the Motion of Aram Systems for a Stay Hearing before Justice O'Brien—Sep. 29, 2006.

Canadian Action No. 0601-08106, *Aram Systems Ltd.* v. *NovAtel Inc. and Patrick Fenton*, Affidavit of Records of NovAtel Inc. and Patrick C. Fenton sworn Oct. 16, 2006.

Canadian Action No. 0601-08106, *Aram Systems Ltd.* v. *NovAtel Inc. and Patrick Fenton*, Affidavit of Records of Aram Systems Ltd. (Virgil Barfield) sworn Oct. 13, 2006.

Canadian Action No. 0601-08106, *Aram Systems Ltd.* v. *NovAtel Inc. and Patrick Fenton*, Affidavit of Records of Norman David Heidebrecht sworn Oct. 13, 2006.

Canadian Action No. 0601-08106, *Aram Systems Ltd.* v. *NovAtel Inc. and Patrick Fenton*, Affidavit of Records of Donald G. Chamberlain sworn Oct. 16, 2006.

Canadian Action No. 0601-08106, *Aram Systems Ltd.* v. *NovAtel Inc. and Patrick Fenton*, Examination for Discovery of Patrick Fenton (NovAtel) on Nov. 14, 2006.

Canadian Action No. 0601-08106, *Aram Systems Ltd.* v. *NovAtel Inc. and Patrick Fenton*, Examination for Discovery of Zelko Bacanek (Aram) on Nov. 15, 2006.

Canadian Action No. 0601-08106, *Aram Systems Ltd.* v. *NovAtel Inc. and Patrick Fenton*, Examination for Discovery of Terry Wood (Aram) on Nov. 15, 2006.

Canadian Action No. 0601-08106, *Aram Systems Ltd.* v. *NovAtel Inc. and Patrick Fenton*, Examination for Discovery of Donald Chamberlain (Aram) on Nov. 16, 2006.

Canadian Action No. 0601-08106, *Aram Systems Ltd.* v. *NovAtel Inc. and Patrick Fenton*, Examination for Discovery of Jonathan Ladd (NovAtel) on Nov. 17, 2006.

Canadian Action No. 0601-08106, *Aram Systems Ltd.* v. *NovAtel Inc. and Patrick Fenton*, Examination for Discovery of Jerald Harmon (Aram) on Nov. 20, 2006.

Canadian Action No. 0601-08106, *Aram Systems Ltd.* v. *NovAtel Inc. and Patrick Fenton*, Examination for Discovery of Virgil Barfield (Aram) on Nov. 21, 2006.

Canadian Action No. 0601-08106, *Aram Systems Ltd.* v. *NovAtel Inc. and Patrick Fenton*, Examination for Discovery of Graham Purves (NovAtel) on Nov. 22, 2006.

Canadian Action No. 0601-08106, *Aram Systems Ltd.* v. *NovAtel Inc. and Patrick Fenton*, Examination for Discovery of Farlin Halsey (NovAtel) on Nov. 24, 2006.

Canadian Action No. 0601-08106, *Aram Systems Ltd.* v. *NovAtel Inc. and Patrick Fenton*, Examination for Discovery of Debora Klaus (NovAtel) on Nov. 27, 2006.

Canadian Action No. 0601-08106, *Aram Systems Ltd.* v. *NovAtel Inc. and Patrick Fenton*, Examination for Discovery of Nicholas Schubert (NovAtel) on Nov. 28-29, 2006.

Canadian Action No. 0601-08106, *Aram Systems Ltd.* v. *NovAtel Inc. and Patrick Fenton*, Examination for Discovery of David Heidebrecht (Aram) on Nov. 30, 2006.

Canadian Action No. 0601-08106, *Aram Systems Ltd.* v. *NovAtel Inc. and Patrick Fenton*, Order of Madam Justice B.E.C. Romaine dated Dec. 6, 2006 amending Order dated Nov. 6, 2006.

Canadian Action No. 0601-08106, *Aram Systems Ltd.* v. *NovAtel Inc. and Patrick Fenton*, Examination for Discovery of Steve Duncombe (NovAtel) on Dec. 12, 2006.

Canadian Action No. 0601-08106, *Aram Systems Ltd.* v. *NovAtel Inc. and Patrick Fenton*, Brief Comment on Stuffco Decision by the Respondent/Plaintiff re: Defendant's Application for Summary Judgment, dated Dec. 15, 2006.

Canadian Action No. 0601-08106, *Aram Systems Ltd.* v. *NovAtel Inc. and Patrick Fenton*, Second Supplementary Written Brief of NovAtel with respect to the Application for Summary Judgment, dated Dec. 15, 2006.

Canadian Action No. 0601-08106, *Aram Systems Ltd.* v. *NovAtel Inc. and Patrick Fenton*, Continuation of Examination for Discovery of David Heidebrecht on Dec. 18, 2006.

Canadian Action No. 0601-08106, *Aram Systems Ltd.* v. *NovAtel Inc. and Patrick Fenton*, Examination on Undertakings of Patrick Fenton (NovAtel) on Dec. 19, 2006.

Canadian Action No. 0601-08106, *Aram Systems Ltd.* v. *NovAtel Inc. and Patrick Fenton*, Supplemental Affidavit of Patrick C. Fenton sworn Dec. 21, 2007.

Canadian Action No. 0601-08106, *Aram Systems Ltd.* v. *NovAtel Inc. and Patrick Fenton*, Bifurcation—Notice of Motion returnable January 8 and 9, 2007 seeking an Order for a stay or bifurcation of the inventorship issues.

Canadian Action No. 0601-08106, *Aram Systems Ltd.* v. *NovAtel Inc. and Patrick Fenton*, Notice of Motion returnable Jan. 8, 2007 seeking an Order compelling answers to certain refused undertakings, dated Dec. 22, 2006.

Canadian Action No. 0601-08106, *Aram Systems Ltd.* v. *NovAtel Inc. and Patrick Fenton*, Affidavit of Donald G. Chamberlain sworn Dec. 19, 2006.

Canadian Action No. 0601-08106, *Aram Systems Ltd.* v. *NovAtel Inc. and Patrick Fenton*, Supplemental Affidavit of Donald G. Chamberlain sworn Dec. 20, 2006.

Canadian Action No. 0601-08106, *Aram Systems Ltd.* v. *NovAtel Inc. and Patrick Fenton*, written Brief of Aram Systems with respect to compelling the Defendants to provide answers to certain refused undertakings to be heard by Special Application on Jan. 8, 2007, dated Dec. 22, 2007.

Canadian Action No. 0601-08106, *Aram Systems Ltd.* v. *NovAtel Inc. and Patrick Fenton*, Affidavit of Donald G. Chamberlain sworn Dec. 22, 2006.

Canadian Action No. 0601-08106, *Aram Systems Ltd.* v. *NovAtel Inc. and Patrick Fenton*, Second Supplemental Affidavit of Richard P. Bauer sworn Dec. 22, 2006.

Canadian Action No. 0601-08106, *Aram Systems Ltd.* v. *NovAtel Inc. and Patrick Fenton*, Reasons for Judgment of the Honourable Madam Justice B.E. Romaine dated Dec. 29, 2006 (summary judgment application).

Canadian Action No. 0601-08106, *Aram Systems Ltd.* v. *NovAtel Inc. and Patrick Fenton*, Order of Madam Justice B.E. Romaine dated Sep. 28, 2006 (dismissing injunction motion), dated Jan. 25, 2007.

Canadian Action No. 0601-08106, *Aram Systems Ltd.* v. *NovAtel Inc. and Patrick Fenton*, Judgment of Madam Justice B.E. Romaine dated Dec. 29, 2006 (summary judgment application), dated Jan. 25, 2007.

Canadian Action No. 0601-08106, *Aram Systems Ltd.* v. *NovAtel Inc. and Patrick Fenton*, Court of Appeal—Civil Notice of Appeal, dated Jan. 2, 2007.

Canadian Action No. 0601-08106, *Aram Systems Ltd.* v. *NovAtel Inc. and Patrick Fenton*, Court of Appeal—Proposed Content of Appeal Books dated Jan. 5, 2007.

Canadian Action No. 0601-08106, *Aram Systems Ltd.* v. *NovAtel Inc. and Patrick Fenton*, Order of Associate Chief Justice N.C. Wittmann dated Jan. 11, 2007 revising timetable and setting tentative trial date to June 4 to 15, 2007, dated Jan. 12, 2007.

Canadian Action No. 0601-08106, *Aram Systems Ltd.* v. *NovAtel Inc. and Patrick Fenton*, Court of Appeal—Order of Mme. Justice Conrad dated Jan. 4, 2007 amending timetable, dated Jan. 15, 2007.

Canadian Action No. 0601-08106, *Aram Systems Ltd.* v. *NovAtel Inc. and Patrick Fenton*, Court of Appeal—Appeal Books (7 Volumes), dated Jan. 22, 2007.

Canadian Action No. 0601-08106, *Aram Systems Ltd.* v. *NovAtel Inc. and Patrick Fenton*, Court of Appeal—Factum of Aram Systems Ltd. with respect to Reasons for Judgment of Madam Justice Romaine dated Dec. 29, 2006, dated Jan. 26, 2007.

Canadian Action No. 0601-08106, *Aram Systems Ltd.* v. *NovAtel Inc. and Patrick Fenton*, Court of Appeal—Respondent's Factum with respect to the Reasons for Judgment of Madam Justice Romaine dated Dec. 29, 2006—B. Book of Authorities—vol. 1, C. Book of Authorities—vol. 2, dated Feb. 9, 2007.

Canadian Action No. 0601-08106, *Aram Systems Ltd.* v. *NovAtel Inc. and Patrick Fenton*, Court of Appeal—Memorandum of Judgment dated Mar. 21, 2007.

Canadian Action No. 0601-08106, *Aram Systems Ltd.* v. *NovAtel Inc. and Patrick Fenton*, Cross-examination on Affidavit of Donald Gordon Chamberlain sworn Dec. 22, 2006 and taken on Apr. 5, 2007.

Canadian Action No. 0601-08106, *Aram Systems Ltd.* v. *NovAtel Inc. and Patrick Fenton*, Order of Associate Chief Justice Wittmann dated Mar. 30, 2007 re timetable for hearing of motion seeking answers on discovery and production of documents pertaining to such answers (Gowlings); bifurcation (McT) and appointment of new Case Management Judge (Gowlings), dated Apr. 10, 2007.

Canadian Action No. 0601-08106, *Aram Systems Ltd.* v. *NovAtel Inc. and Patrick Fenton*, Second Supplemental Affidavit of David M. Quinlan sworn Apr. 10, 2007.

Canadian Action No. 0601-08106, *Aram Systems Ltd.* v. *NovAtel Inc. and Patrick Fenton*, Appendix "A" to the Second Supplemental Affidavit of David M. Quinlan sworn Apr. 10, 2007.

Canadian Action No. 0601-08106, *Aram Systems Ltd.* v. *NovAtel Inc. and Patrick Fenton*, Amended Statement of Defence and Amended Counterclaim, dated Apr. 12, 2007.

Canadian Action No. 0601-08106, *Aram Systems Ltd.* v. *NovAtel Inc. and Patrick Fenton*, Bifurcation/Stay—Amended Notice of Motion returnable May 4, 2007 for stay and bifurcation, dated Apr. 10, 2007.

Canadian Action No. 0601-08106, *Aram Systems Ltd.* v. *NovAtel Inc. and Patrick Fenton*, Written Brief of NovAtel Inc. and Patrick C. Fenton with respect to their Application for a Stay of Proceedings (Special on May 4, 2007), dated Apr. 20, 2007.

Canadian Action No. 0601-08106, *Aram Systems Ltd.* v. *NovAtel Inc. and Patrick Fenton*, A. vol. 1 Book of Authorities (re: No. 98), B. vol. 2 Book of Authorities (re: No. 98), C. Book of Exhibits and Cross-Examinations Transcripts, dated Apr. 20, 2007.

Canadian Action No. 0601-08106, *Aram Systems Ltd.* v. *NovAtel Inc. and Patrick Fenton*, Written Brief of NovAtel Inc. and Patrick C. Fenton in response to Aram System Ltd.'s Motion to Compel Answers to Certain Refused Undertakings (Special on May 4, 2007) dated Apr. 20, 2007.

Canadian Action No. 0601-08106, *Aram Systems Ltd.* v. *NovAtel Inc. and Patrick Fenton*, Notice of Motion for Order striking paragraphs from Amended Statement of Defence and Amended Counterclaim and with respect to attornment, returnable May 4, 2007, dated Apr. 20, 2007.

Canadian Action No. 0601-08106, *Aram Systems Ltd.* v. *NovAtel Inc. and Patrick Fenton*, Written Brief of Aram Systems with respect to an Application pursuant to Rule 131 to Strike Portions of the Amended Statement of Defence and Amended Counterclaim (Special on May 4, 2007), dated Apr. 20, 2007.

Canadian Action No. 0601-08106, *Aram Systems Ltd.* v. *NovAtel Inc. and Patrick Fenton*, Notice of Motion of Aram Systems for an Order bifurcating liability and damages pursuant to Rule 221 returnable May 4, 2007, dated Apr. 25, 2007.

Canadian Action No. 0601-08106, *Aram Systems Ltd.* v. *NovAtel Inc. and Patrick Fenton*, Affidavit of Donald G. Chamberlain sworn Apr. 24, 2007, dated Apr. 25, 2007.

Canadian Action No. 0601-08106, *Aram Systems Ltd.* v. *NovAtel Inc. and Patrick Fenton*, Written Brief of Aram Systems re: bifurcating liability and damages issues for Special Application on May 4, 2007, dated Apr. 25, 2007.

Canadian Action No. 0601-08106, *Aram Systems Ltd.* v. *NovAtel Inc. and Patrick Fenton*, Reply Brief of NovAtel with respect to the Application of Aram Systems Ltd. pursuant to Rule 131 to Strike portions of the Amended Statement of Defence and Amended Counterclaim scheduled to be heard on May 4, 2007, dated Apr. 27, 2007.

Canadian Action No. 0601-08106, *Aram Systems Ltd.* v. *NovAtel Inc. and Patrick Fenton*, Written Brief of Aram with respect to NovAtel's application to stay trial or bifurcate from trial issues as to inventorship, dated Apr. 27, 2007.

Canadian Action No. 0601-08106, *Aram Systems Ltd.* v. *NovAtel Inc. and Patrick Fenton*, Two Volumes of the Book of Authorities re #107.

Canadian Action No. 0601-08106, *Aram Systems Ltd.* v. *NovAtel Inc. and Patrick Fenton*, Court of Appeal—Certificate that Aram's appeal has been struck from the list, dated May 1, 2007.

Canadian Action No. 0601-08106, *Aram Systems Ltd.* v. *NovAtel Inc. and Patrick Fenton*, Supplemental Written Brief of Aram Systems with respect to NovAtel's application to stay trial or bifurcate from trial issues as to inventorship scheduled to be heard on May 4, 2007, dated May 2, 2007.

Canadian Action No. 0601-08106, *Aram Systems Ltd.* v. *NovAtel Inc. and Patrick Fenton*, Reply Brief of NovAtel with respect to the Application of Aram Systems Ltd. pursuant to Rule 221to bifurcate issues of damages and liability scheduled to be heard on May 10, 2007, dated May 7, 2007.

Canadian Action No. 0601-08106, *Aram Systems Ltd.* v. *NovAtel Inc. and Patrick Fenton*, Affidavit of Patrick C. Fenton sworn May 7, 2007 in support of application to adjourn trial from Jun. 2007 to the Fall of 2007.

Canadian Action No. 0601-08106, *Aram Systems Ltd.* v. *NovAtel Inc. and Patrick Fenton*, Notice of Motion of NovAtel scheduled for May 9, 2007 for an Order compelling Aram to answer undertakings, dated May 7, 2007.

Canadian Action No. 0601-08106, *Aram Systems Ltd.* v. *NovAtel Inc. and Patrick Fenton*, Affidavit of Patrick C. Fenton sworn May 7, 2007 in support of application for an Order compelling Aram to answer undertakings.

Canadian Action No. 0601-08106, *Aram Systems Ltd.* v. *NovAtel Inc. and Patrick Fenton*, Written Rebuttal Brief of Aram Systems in Rebuttal to the Reply Submissions of NovAtel on Aram's Motion to Bifurcate Issues of Liability and Damages to be heard on May 10, 2007, dated May 8, 2007.

Canadian Action No. 0601-08106, *Aram Systems Ltd.* v. *NovAtel Inc. and Patrick Fenton*, Book of Authorities of Aram Systems in Rebuttal to the Reply Submissions of NovAtel on Aram's Motion to Compel Answers to Certain Questions and Undertakings Refused to be heard on May 10, 2007, dated May 8, 2007.

Canadian Action No. 0601-08106, *Aram Systems Ltd.* v. *NovAtel Inc. and Patrick Fenton*, Transcript of Reasons for Judgment of Madam Justice Bensler delivered orally, dated May 10, 2007.

Canadian Action No. 0601-08106, *Aram Systems Ltd.* v. *NovAtel Inc. and Patrick Fenton*, Notice of Motion of NovAtel returnable May 16, 2007 seeking an Order adjourning the trial and completion of Examinations for Discovery and interlocutory proceedings, dated May 11, 2007.

Canadian Action No. 0601-08106, *Aram Systems Ltd.* v. *NovAtel Inc. and Patrick Fenton*, Affidavit of Christopher Chamberlain sworn May 14, 2007.

Canadian Action No. 0601-08106, *Aram Systems Ltd.* v. *NovAtel Inc. and Patrick Fenton*, Plaintiff's Written Reply to Motion of NovAtel Seeking adjournment of trial scheduled for Jun. 4-15, 2007—Chambers application scheduled before Associate Chief Justice Wittmann on May 16, 2007, dated May 15, 2007.

Canadian Action No. 0601-08106, *Aram Systems Ltd.* v. *NovAtel Inc. and Patrick Fenton*, Notice to Admit Facts, dated May 16, 2007.

Canadian Action No. 0601-08106, *Aram Systems Ltd.* v. *NovAtel Inc. and Patrick Fenton*, Supplemental Notice to Admit Facts, dated May 16, 2007.

Canadian Action No. 0601-08106, *Aram Systems Ltd.* v. *NovAtel Inc. and Patrick Fenton*, Order of Justice P.M. Clark dated May 4, 2007 pursuant to Rule 131 to strike portions of Amended Statement of Defence, Transcript of Proceedings before Justice Clark on May 4, 2007, Transcript of Proceedings before Justice Clark on May 4, 2007, dated May 16, 2007.

Canadian Action No. 0601-08106, *Aram Systems Ltd.* v. *NovAtel Inc. and Patrick Fenton*, Transcript of Reason for Judgment of Madam Justice Bensler delivered orally on May 10, 2007.

Canadian Action No. 0601-08106, *Aram Systems Ltd.* v. *NovAtel Inc. and Patrick Fenton*, Second Supplemental Notice to Admit Facts, dated May 17, 2007.

Canadian Action No. 0601-08106, *Aram Systems Ltd.* v. *NovAtel Inc. and Patrick Fenton*, Reply to Notice to Admit Facts, dated May 25, 2007.

Canadian Action No. 0601-08106, *Aram Systems Ltd.* v. *NovAtel Inc. and Patrick Fenton*, Reply to Supplemental Notice to Admit Facts, dated May 25, 2007.

Canadian Action No. 0601-08106, *Aram Systems Ltd.* v. *NovAtel Inc. and Patrick Fenton*, Reply to Second Supplemental Notice to Admit Facts, dated May 25, 2007.

Canadian Action No. 0601-08106, *Aram Systems Ltd.* v. *NovAtel Inc. and Patrick Fenton*, Amended Amended Statement of Defence and Amended Amended Counterclaim, dated May 29, 2007.

Canadian Action No. 0601-08106, *Aram Systems Ltd.* v. *NovAtel Inc. and Patrick Fenton*, Order of Madam Justice S.M. Bensler dated May 10, 2007 bifurcating liability and damages at trial, dated May 31, 2007.

Canadian Action No. 0601-08106, *Aram Systems Ltd.* v. *NovAtel Inc. and Patrick Fenton*, Order of Associate Chief Justice Wittmann dated May 16, 2007, dated Jun. 1, 2007.

Canadian Action No. 0601-08106, *Aram Systems Ltd.* v. *NovAtel Inc. and Patrick Fenton*, Order of Associate Chief Justice Wittmann dated May 26, 2007, dated Jun. 1, 2007.

Canadian Action No. 0601-08106, *Aram Systems Ltd.* v. *NovAtel Inc. and Patrick Fenton*, Amended Reply by Aram Systems Ltd. to Amended Amended Statement of Defence, dated Jun. 15, 2007.

Canadian Action No. 0601-08106, *Aram Systems Ltd.* v. *NovAtel Inc. and Patrick Fenton*, Written Brief of NovAtel regarding certain refused undertakings, special application before Justice S.M. Bensler in Chambers on Jun. 18, 2007, dated Jun. 15, 2007.

Canadian Action No. 0601-08106, *Aram Systems Ltd.* v. *NovAtel Inc. and Patrick Fenton*, Written Brief of Aram Systems Ltd. regarding certain undertakings refused, special application before Justice S.M. Bensler in Chambers on Jun. 18, 2007, dated Jun. 15, 2007.

Canadian Action No. 0601-08106, *Aram Systems Ltd.* v. *NovAtel Inc. and Patrick Fenton*, Order of Madam Justice S.M. Bensler dated Jun. 18, 2007.

Canadian Action No. 0601-08106, *Aram Systems Ltd.* v. *NovAtel Inc. and Patrick Fenton*, Expert Report of Dr. Pratap Misra, dated Jun. 15, 2007.

Canadian Action No. 0601-08106, *Aram Systems Ltd.* v. *NovAtel Inc. and Patrick Fenton*, Expert Report of David M. Quinlan, dated Jun. 15, 2007.

Canadian Action No. 0601-08106, *Aram Systems Ltd.* v. *NovAtel Inc. and Patrick Fenton*, Expert Report of Dr. Michel Fattouche dated Jun. 11, 2007.

Canadian Action No. 0601-08106, *Aram Systems Ltd.* v. *NovAtel Inc. and Patrick Fenton*, Expert Report of Thomas Schatzel, dated Jun. 20, 2007.

Canadian Action No. 0601-08106, *Aram Systems Ltd.* v. *NovAtel Inc. and Patrick Fenton*, Expert Report of Boris Kreye, dated Jun. 25, 2007.

Canadian Action No. 0601-08106, *Aram Systems Ltd.* v. *NovAtel Inc. and Patrick Fenton*, Supplemental Affidavit of Christopher Chamberlain sworn Jun. 26, 2007.

Canadian Action No. 0601-08106, *Aram Systems Ltd.* v. *NovAtel Inc. and Patrick Fenton*, Supplemental Revised Affidavit of Christopher Chamberlain sworn Jun. 27, 2007.

Canadian Action No. 0601-08106, *Aram Systems Ltd.* v. *NovAtel Inc. and Patrick Fenton*, Order of Associate Chief Justice N.C. Wittman dated Jun. 27, 2007, filed Jul. 5, 2007.

Canadian Action No. 0601-08106, *Aram Systems Ltd.* v. *NovAtel Inc. and Patrick Fenton*, Notice of Motion returnable Jul. 23, 2007 for an Order to strike portion of Expert Report of David Quinlan dated Jun. 15, 2007, filed Jul. 9, 2007.

Canadian Action No. 0601-08106, *Aram Systems Ltd.* v. *NovAtel Inc. and Patrick Fenton*, Written Brief of Aram with respect to striking certain portions of the Expert Report of David Quinlan dated Jun. 15, 2007, dated Jul. 9, 2007.

Canadian Action No. 0601-08106, *Aram Systems Ltd.* v. *NovAtel Inc. and Patrick Fenton*, Reply Brief of NovAtel Inc. with respect to Aram's application to strike portions of the Expert Report of David Quinlan returnable Jul. 23, 2007 before Justice Clark, dated Jul. 16, 2007.

Canadian Action No. 0601-08106, *Aram Systems Ltd.* v. *NovAtel Inc. and Patrick Fenton*, Third Supplemental Notice to Admit Facts, dated Jul. 18, 2007.

Canadian Action No. 0601-08106, *Aram Systems Ltd.* v. *NovAtel Inc. and Patrick Fenton*, Supplemental Written Brief of Aram Systems with respect to the application to strike portions of the Expert Report of David Quinlan to be heard before Justice Clark on Jul. 23, 2007.

Canadian Action No. 0601-08106, *Aram Systems Ltd.* v. *NovAtel Inc. and Patrick Fenton*, Concurrent Offer of Judgment and Offer to Settle [Rules 169 and 170] of NovAtel, dated Aug. 14, 2007.

Canadian Action No. 0601-08106, *Aram Systems Ltd.* v. *NovAtel Inc. and Patrick Fenton*, Offer to Settle [Rule 170 and 174(2) of the Alberta Rules of Court], dated Aug. 16, 2007.

Canadian Action No. 0601-08106, *Aram Systems Ltd.* v. *NovAtel Inc. and Patrick Fenton*, Reply to Notice to Admit Expert Opinion of Dr. Michel Fattouche dated Aug. 17, 2007.

Canadian Action No. 0601-08106, *Aram Systems Ltd.* v. *NovAtel Inc. and Patrick Fenton*, Revised Reply to Reply to Third Supplemental Notice to Admit Facts dated Aug. 20, 2007.

Canadian Action No. 0601-08106, *Aram Systems Ltd.* v. *NovAtel Inc. and Patrick Fenton*, Reply to Third Supplemental Notice to Admit Facts dated Aug. 17, 2007.

Canadian Action No. 0601-08106, *Aram Systems Ltd.* v. *NovAtel Inc. and Patrick Fenton*, Notice of Motion returnable Aug. 31, 2007 for an Order striking certain portions of the Discovery Acceptance Form of Virgil G. Barfield dated Jul. 19, 2007, filed Aug. 24, 2007.

Canadian Action No. 0601-08106, *Aram Systems Ltd.* v. *NovAtel Inc. and Patrick Fenton*, Written Brief of NovAtel regarding an Order striking certain portions of the Discovery Acceptance Form of Virgil G. Barfield dated Jul. 19, 2007 , dated Aug. 24, 2007.

Canadian Action No. 0601-08106, *Aram Systems Ltd.* v. *NovAtel Inc. and Patrick Fenton*, Respondent's Brief of Argument with respect to Brief of NovAtel Inc. to be heard before the Presiding Justice in Special Chambers on Friday, Aug. 31, 2007, dated Aug. 29, 2007.

Canadian Action No. 0601-08106, *Aram Systems Ltd.* v. *NovAtel Inc. and Patrick Fenton*, Notice of Intention pursuant to Rule 296.1 not to call Debora Klause and Graham Purves at trial.

Canadian Action No. 0601-08106, *Aram Systems Ltd.* v. *NovAtel Inc. and Patrick Fenton*, Expert Statement pursuant to Rule 218.1 of the Alberta Rules of Court of Yasunori Ohtsuka.

Canadian Action No. 0601-08106, *Aram Systems Ltd.* v. *NovAtel Inc. and Patrick Fenton*, Expert Statement Pursuant to Rule 218.12 of the Alberta Rules of Court and Rebuttal Report of Partap Misra pursuant to Rule 218.1 re report of Michel Fattouche, dated Aug. 31, 2007.

Canadian Action No. 0601-08106, *Aram Systems Ltd.* v. *NovAtel Inc. and Patrick Fenton*, Expert Statement Pursuant to Rule 218.12 of the Alberta Rules of Court and Rebuttal Report of Korbinian Kopf pursuant to Rule 218.1 re report of Boris Kreye, dated Aug. 31, 2007.

Canadian Action No. 0601-08106, *Aram Systems Ltd.* v. *NovAtel Inc. and Patrick Fenton*, Expert Statement Pursuant to Rule 218.12 of the Alberta Rules of Court and Rebuttal Report of Bruce Stoner pursuant to Rule 218.1 re report of Thomas Schatze, dated Aug. 31, 2007.

Canadian Action No. 0601-08106, *Aram Systems Ltd.* v. *NovAtel Inc. and Patrick Fenton*, Notice of Intention Pursuant to Rule 218.1(2) and (3) of the Alberta Rules of Court re: report of Yasounori Ohtsuka dated Aug. 31, 2007, filed Sep. 4, 2007.

Canadian Action No. 0601-08106, *Aram Systems Ltd.* v. *NovAtel Inc. and Patrick Fenton*, Notice of Intention Pursuant to Rule 218.1(2) and (3) of the Alberta Rules of Court re: report of Korbinian Kopf dated Aug. 31, 2007, filed Sep. 4, 2007.

Canadian Action No. 0601-08106, *Aram Systems Ltd.* v. *NovAtel Inc. and Patrick Fenton*, Rule 218.12 Statement of Expert Rebuttal Opinion of Danny Huntington (re David Quinlan's report sworn Jun. 15, 2007), dated Sep. 4, 2007.

Canadian Action No. 0601-08106, *Aram Systems Ltd.* v. *NovAtel Inc. and Patrick Fenton*, Notice of Intention Pursuant to Rule 218.1(2) and (3) of the Alberta Rules of Court re Expert Report of Kazuhiko Yoshida dated Jun. 14, 2007, filed Sep. 6, 2007.

Canadian Action No. 0601-08106, *Aram Systems Ltd.* v. *NovAtel Inc. and Patrick Fenton*, Statement in Reply to Notice of Intention of Defendants to Enter as Evidence at Trial the Report of Yasunori Ohtsuka, dated Sep. 10, 2007.

Canadian Action No. 0601-08106, *Aram Systems Ltd.* v. *NovAtel Inc. and Patrick Fenton*, Statement in Reply to Notice of Intention of Defendants to Enter as Evidence at Trial the Report of Korbinian Kopf, dated Sep. 10, 2007.

Canadian Action No. 0601-08106, *Aram Systems Ltd.* v. *NovAtel Inc. and Patrick Fenton*, Notice of Intention Pursuant to Rule 218.1(2) and (3) of the Alberta Rules of Court re Expert Report of Boris Krey dated Jun. 25, 2007, filed Sep. 10, 2007.

Canadian Action No. 0601-08106, *Aram Systems Ltd.* v. *NovAtel Inc. and Patrick Fenton*, Amended Amended Amended Statement of Defence and Amended Amended Amended Counterclaim, dated Sep. 13, 2007.

Canadian Action No. 0601-08106, *Aram Systems Ltd.* v. *NovAtel Inc. and Patrick Fenton*, Further Amended Reply to Amended Amended Amended Statement of Defence and Amended Amended Amended Counterclaim, dated Sep. 17, 2007.

Canadian Action No. 0601-08106, *Aram Systems Ltd.* v. *NovAtel Inc. and Patrick Fenton*, Statement in Reply to Notice of Intention of the Plaintiff to Enter as Evidence at Trial the Report of Kazuhiko Yoshida, dated Sep. 18, 2007.

Canadian Action No. 0601-08106, *Aram Systems Ltd.* v. *NovAtel Inc. and Patrick Fenton*, Statement in Reply to Notice of Intention of the Plaintiff to Enter as Evidence at Trial the Report of Boris Kreye, dated Sep. 18, 2007.

Canadian Action No. 0601-08106, *Aram Systems Ltd.* v. *NovAtel Inc. and Patrick Fenton*, Pre-trial Brief of NovAtel for the trial to be heard before the Honourable Mr. Justice A.D. Macleod commencing Oct. 1, 2007 and Book of Authorities, dated Sep. 25, 2007.

Canadian Action No. 0601-08106, *Aram Systems Ltd.* v. *NovAtel Inc. and Patrick Fenton*, (a) Plaintiff's Brief of Relevant Issues and Applicable Law and authorities, (b) and (c) Trial Record (filed and unfiled) (d) and (e) 2 Vols. of Table of Authorities #1-37, dated Sep. 25, 2007.

Canadian Action No. 0601-08106, *Aram Systems Ltd.* v. *NovAtel Inc. and Patrick Fenton*, Continued Examination for Discovery of Jerald Harmon, dated Sep. 26, 2007.

Canadian Action No. 0601-08106, *Aram Systems Ltd.* v. *NovAtel Inc. and Patrick Fenton*, Notice of Withdrawal of Concurrent Offer of Judgment and Offer to Settle [Rule 170(5)], dated Sep. 28, 2007.

Canadian Action No. 0601-08106, *Aram Systems Ltd.* v. *NovAtel Inc. and Patrick Fenton*, Notice of Withdrawal of Offer, dated Oct. 1, 2007.

Canadian Action No. 0601-08106, *Aram Systems Ltd.* v. *NovAtel Inc. and Patrick Fenton*, Justice Clark's Order of Aug. 13, 2007.

Canadian Action No. 0601-08106, *Aram Systems Ltd.* v. *NovAtel Inc. and Patrick Fenton*, Justice Kent's Order of Aug. 31, 2007, dated Oct. 12, 2007.

Canadian Action No. 0601-08106, *Aram Systems Ltd.* v. *NovAtel Inc. and Patrick Fenton*, Pre-trial Brief of NovAtel for the trial to be heard before the Honourable Mr. Justice A.D. Macleod commencing Oct. 1, 2007, dated Sep. 25, 2007.

Canadian Action No. 0601-08106, *Aram Systems Ltd.* v. *NovAtel Inc. and Patrick Fenton*, Notice of Motion to be heard on Oct. 19, 2007 before Justice A.D. Macleod for an Order striking certain portions of the Expert Report of David Quinlan dated Jun. 15, 2007, filed Oct. 16, 2007.

Canadian Action No. 0601-08106, *Aram Systems Ltd.* v. *NovAtel Inc. and Patrick Fenton*, Written Brief of Aram Systems Ltd. with respect to its motion seeking to strike certain portions of the Expert Report of David Quinlan dated Jun. 15, 2007, dated Oct. 15, 2007.

Canadian Action No. 0601-08106, *Aram Systems Ltd.* v. *NovAtel Inc. and Patrick Fenton*, Brief of NovAtel with respect to the Application of Aram Systems Ltd. to strike portions of the Expert Opinion of David Quinlan to be heard before the Honourable Mr. Justice A.D. Macleod on Friday, Oct. 19, 2007, dated Oct. 16, 2007.

Canadian Action No. 0601-08106, *Aram Systems Ltd.* v. *NovAtel Inc. and Patrick Fenton*, Series of email messages (Exhibit P-48 of Dec. 18, 2006 Examination for Discovery of David Heidebrecht), various dates.

Canadian Action No. 0601-08106, *Aram Systems Ltd.* v. *NovAtel Inc. and Patrick Fenton*, Aries RSR (Exhibit P-59 of May 22, 2007 examination of Virgil Barfield).

Canadian Action No. 0601-08106, *Aram Systems Ltd.* v. *NovAtel Inc. and Patrick Fenton*, SEG 2001 Aram Marketing Review "Structure for Growth" (Exhibit P-60 of May 22, 2007 Examination for Discovery of Virgil Barfield), dated Sep. 9, 2001.

Canadian Action No. 0601-08106, *Aram Systems Ltd.* v. *NovAtel Inc. and Patrick Fenton*, "Conquering Seismic Challenges" (Exhibit P-41 of Nov. 21, 2006 Examination for Discovery of Virgil Barfield).

Canadian Action No. 0601-08106, *Aram Systems Ltd.* v. *NovAtel Inc. and Patrick Fenton*, Geo-X Systems travel and Entertainment Expenses (Exhibit P-49 of Dec. 18, 2006 Examination for Discovery of David Heidebrecht), dated Sep. 7, 2001.

Canadian Action No. 0601-08106, *Aram Systems Ltd.* v. *NovAtel Inc. and Patrick Fenton*, Email from David Heidebrecht to Terry Wood; and from Tim Jones to David Heidebrecht re: Trimble Information (Exhibit P-16 of Nov. 15, 2006 Examination for Discovery of Terry Wood), dated Sep. 24, 2001.

Canadian Action No. 0601-08106, *Aram Systems Ltd.* v. *NovAtel Inc. and Patrick Fenton*, E-mail From David Heidebrecht to Terry wood re Trimble GPS products, dated Sep. 25, 2001.

Canadian Action No. 0601-08106, *Aram Systems Ltd.* v. *NovAtel Inc. and Patrick Fenton*, Email from Tim Jones to David Heidebrecht re: Embedded product offering (Exhibit P-5 of Nov. 15, 2006 Examination for Discovery of Zeljko Bacanek), dated Sep. 26, 2001.

Canadian Action No. 0601-08106, *Aram Systems Ltd.* v. *NovAtel Inc. and Patrick Fenton*, E-mail from David Heidebrecht to Terry wood re Tim Jones of Trimble, dated Sep. 26, 2007.

Canadian Action No. 0601-08106, *Aram Systems Ltd.* v. *NovAtel Inc. and Patrick Fenton*, E-mail from David Heidebrecht to Terry Wood re DCI Nextech, dated Sep. 26, 2001.

Canadian Action No. 0601-08106, *Aram Systems Ltd.* v. *NovAtel Inc. and Patrick Fenton*, E-mail from Eric de Kruyff of dci Nextech, dated Sep. 26, 2001.

Canadian Action No. 0601-08106, *Aram Systems Ltd.* v. *NovAtel Inc. and Patrick Fenton*, Email from Jerry Harmon to David Heidebrecht re: Impact of patents 6078283, 5724241 and 6188962 (Exhibit P-27 of Nov. 16, 2006 Examination for Discovery of Donald Chamberlain), dated Oct. 8, 2001.

Canadian Action No. 0601-08106, *Aram Systems Ltd.* v. *NovAtel Inc. and Patrick Fenton*, Email from Jerry Harmon to David Heidebrecht re: Two more patents 5,276,655 and 4,589,100 (Exhibit P-28 of Nov. 20, 2006 Examination for Discovery of Jerald Harmon), dated Oct. 9, 2001.

Canadian Action No. 0601-08106, *Aram Systems Ltd.* v. *NovAtel Inc. and Patrick Fenton*, Email from Mike April to Zeljko Bacanek re: Precise Freq. Reference (Exhibit P-6 from Nov. 15, 2006 Examination for Discovery of Zeljko Bacanek), dated Oct. 12, 2001.

Canadian Action No. 0601-08106, *Aram Systems Ltd.* v. *NovAtel Inc. and Patrick Fenton*, Geo-X Systems travel and Entertainment Expenses (Exhibit P-49 of Dec. 18, 2006 Examination for Discovery of David Heidebrecht), dated Oct. 22, 2001.

Canadian Action No. 0601-08106, *Aram Systems Ltd.* v. *NovAtel Inc. and Patrick Fenton*, Forwarded email to Jerry Harmon re: Patent search (Exhibit P-29 of Nov. 20, 2006 Examination for Discovery of Jerald Harmon), dated Nov. 1, 2001.

Canadian Action No. 0601-08106, *Aram Systems Ltd.* v. *NovAtel Inc. and Patrick Fenton*, Email from Roslyn Darroch to Terry Wood re: u-blox (Exhibit P-15 of Nov. 15, 2006 Examination for Discovery of Zeljko Bacanek), dated Nov. 9, 2001.

Canadian Action No. 0601-08106, *Aram Systems Ltd.* v. *NovAtel Inc. and Patrick Fenton*, Year 2001 Logbook (Exhibit P-42 to the Nov. 30, 2006 Examination of David Heidebrecht).

Canadian Action No. 0601-08106, *Aram Systems Ltd.* v. *NovAtel Inc. and Patrick Fenton*, Article from GPS World re: Assisted GPS (Exhibit P-7 from Nov. 15, 2006 Examination for Discovery of Zeljko Bacanek), dated Mar. 1, 2002.

Canadian Action No. 0601-08106, *Aram Systems Ltd.* v. *NovAtel Inc. and Patrick Fenton*, Email from Jerry Harmon to David Heidebrecht re: ARIES patent application (Exhibit P-30 of Nov. 20, 2006 Examination for Discovery of Jerald Harmon), dated Mar. 6, 2002.

Canadian Action No. 0601-08106, *Aram Systems Ltd.* v. *NovAtel Inc. and Patrick Fenton*, E-mail from Tim Jones to Terry Wood with attachments re Trimble GPS product, dated Apr. 1, 2002.

Canadian Action No. 0601-08106, *Aram Systems Ltd.* v. *NovAtel Inc. and Patrick Fenton*, E-mail from Terry Wood to Tim Jones re Lassen SQ unit, dated Apr. 2, 2002.

Canadian Action No. 0601-08106, *Aram Systems Ltd.* v. *NovAtel Inc. and Patrick Fenton*, E-mail from Jerry Harmon to David Heidebrecht, dated Apr. 10, 2002.

Canadian Action No. 0601-08106, *Aram Systems Ltd.* v. *NovAtel Inc. and Patrick Fenton*, E-mail from Tim Jones to Terry Wood, dated Apr. 15, 2002.

Canadian Action No. 0601-08106, *Aram Systems Ltd.* v. *NovAtel Inc. and Patrick Fenton*, Building schematics/Diagram (Exhibit P-46 of Dec. 18, 2006 Examination for Discovery of David Heidebrecht), dated Jun. 6, 2002.

Canadian Action No. 0601-08106, *Aram Systems Ltd.* v. *NovAtel Inc. and Patrick Fenton*, E-mail from Tim Jones to David Heidebrecht regarding Trimble GPS product, dated Aug. 2, 2001.

Canadian Action No. 0601-08106, *Aram Systems Ltd.* v. *NovAtel Inc. and Patrick Fenton*, Email from David Heidebrecht to Jerry Harmon re: RF Synchronization patent (Exhibit P-31 of Nov. 20, 2006 Examination for Discovery of Jerald Harmon), dated Aug. 23, 2002.

Canadian Action No. 0601-08106, *Aram Systems Ltd.* v. *NovAtel Inc. and Patrick Fenton*, From Trimble Website, Why a GPS Receiver Must Determine its Correct Geographic Position before it Calculates Correct GPS time, dated Aug. 2002.

Canadian Action No. 0601-08106, *Aram Systems Ltd.* v. *NovAtel Inc. and Patrick Fenton*, Fax to Jerry Harmon from David Heidebrecht re RF Patent, dated Sep. 4, 2002.

Canadian Action No. 0601-08106, *Aram Systems Ltd.* v. *NovAtel Inc. and Patrick Fenton*, Email from David Heidebrecht to Allen Marcontell and Jerry Harmon and attachment (Exhibit P-32 to Nov. 20, 2006 Examination for Discovery of Jerald Harmon), dated Sep. 6, 2002.

Canadian Action No. 0601-08106, *Aram Systems Ltd.* v. *NovAtel Inc. and Patrick Fenton*, Email from Nerac to David Heidebrecht enclosing patent searches, dated Sep. 6, 2002.

Canadian Action No. 0601-08106, *Aram Systems Ltd.* v. *NovAtel Inc. and Patrick Fenton*, Fax from David Heidebrecht to Jerry Harmon re: Wireless Ram; and Clock Module Mobile (Exhibit P-8 from Nov. 15, 2006 Examination for Discovery of Zeljko Bacanek), dated Sep. 10, 2002.

Canadian Action No. 0601-08106, *Aram Systems Ltd.* v. *NovAtel Inc. and Patrick Fenton*, E-mail from Mike Crowe of Microwe Electronics Corp. to Zeljko Bacanek, dated Sep. 12, 2002.

Canadian Action No. 0601-08106, *Aram Systems Ltd.* v. *NovAtel Inc. and Patrick Fenton*, E-mail from Mike Crowe to Zielko Bacanek re Leadtek GPS units, dated Sep. 22, 2002.

Canadian Action No. 0601-08106, *Aram Systems Ltd.* v. *NovAtel Inc. and Patrick Fenton*, Aram U.S. Appl. No. 60/416,070 (Exhibit P-17 of Nov. 16, 2006 Examination for Discovery of Donald Chamberlain), dated Oct. 4, 2002.

Canadian Action No. 0601-08106, *Aram Systems Ltd.* v. *NovAtel Inc. and Patrick Fenton*, Email from David Heidebrecht to Terry Wood re E-mail from Mike Crowe of Microwe Electronics to David Heidebrecht, dated Oct. 23, 2002.

Canadian Action No. 0601-08106, *Aram Systems Ltd.* v. *NovAtel Inc. and Patrick Fenton*, Year 2002 Logbook (Exhibit P-43 to the Nov. 30, 2006 Examination of David Heidebrecht).

Canadian Action No. 0601-08106, *Aram Systems Ltd.* v. *NovAtel Inc. and Patrick Fenton*, Email from David Heidebrecht to Glenn Skelton, Zeljko Bacanek and Terry Wood re: Summary of projects (Exhibit P-9 of Nov. 15, 2006 Examination for Discovery of Zeljko Bacanek), dated Jan. 31, 2003.

Canadian Action No. 0601-08106, *Aram Systems Ltd.* v. *NovAtel Inc. and Patrick Fenton*, Current Project Report revised by Terry Wood (Exhibit P-10 of Nov. 15, 2006 Examination for Discovery of Zeljko Bacanek), dated Feb. 3, 2003.

Canadian Action No. 0601-08106, *Aram Systems Ltd.* v. *NovAtel Inc. and Patrick Fenton*, E-mail from Heidebrecht to Wood re Adcon Telemetry, dated May 4, 2003.

Canadian Action No. 0601-08106, *Aram Systems Ltd.* v. *NovAtel Inc. and Patrick Fenton*, Email from Jerry Harmon to David Heidebrecht re: Nerac conference call (Exhibit P-33 of Nov. 20, 2006 Examination for Discovery of Jerald Harmon), dated May 2, 2003.

Canadian Action No. 0601-08106, *Aram Systems Ltd.* v. *NovAtel Inc. and Patrick Fenton*, E-mail from NERAC to David Heidebrecht, dated May 5, 2003.

Canadian Action No. 0601-08106, *Aram Systems Ltd.* v. *NovAtel Inc. and Patrick Fenton*, Calendar with Attached Calendars (Exhibit D-10 from Nov. 14, 2006 Examination for Discovery of Fenton, dated Jun. 2003.

Canadian Action No. 0601-08106, *Aram Systems Ltd.* v. *NovAtel Inc. and Patrick Fenton*, E-Mail from Nicholas Schubert re meeting with Geo-X (Exhibit D-5 from Nov. 14, 2006 Examination for Discovery of Fenton, also marked as Exhibit D-55 from Ladd discovery), dated Jun. 11, 2003.

Canadian Action No. 0601-08106, *Aram Systems Ltd.* v. *NovAtel Inc. and Patrick Fenton*, Notes of Schubert (Exhibit D-6 from Nov. 14, 2006 Examination for Discovery of Fenton), dated Jun. 11, 2003.

Canadian Action No. 0601-08106, *Aram Systems Ltd.* v. *NovAtel Inc. and Patrick Fenton*, E-mail from Nicholas Schubert to Dave Heidebrecht re Meeting follow-up (Exhibit D-7 from Nov. 14, 2006 Examination for Discovery of Fenton), dated Jun. 12, 2003.

Canadian Action No. 0601-08106, *Aram Systems Ltd.* v. *NovAtel Inc. and Patrick Fenton*, Email from Nicholas Schubert to David Heidebrecht re: potential meeting (Exhibit D-61 from Nov. 22, 2006 Examination for discovery of G. Purves), dated Jun. 13, 2003.

Canadian Action No. 0601-08106, *Aram Systems Ltd.* v. *NovAtel Inc. and Patrick Fenton*, Email from Nicholas Schubert to David Heidebrecht re: potential meeting (Exhibit D-67 from Nov. 24, 2006 Examination for Discovery of F. Halsey), dated Jun. 13, 2003.

Canadian Action No. 0601-08106, *Aram Systems Ltd.* v. *NovAtel Inc. and Patrick Fenton*, E-mail from Nicholas Schubert to David Heidebrecht—Re: Potential Wednesday meeting, dated Jun. 13, 2003.

Canadian Action No. 0601-08106, *Aram Systems Ltd.* v. *NovAtel Inc. and Patrick Fenton*, E-mail from David Heidebrecht to Nicholas Schubert—Re: Potential Wednesday meeting, dated Jun. 16, 2003.

Canadian Action No. 0601-08106, *Aram Systems Ltd.* v. *NovAtel Inc. and Patrick Fenton*, Meeting request from Nicholas Schubert to discuss L1 products (Exhibit D-8 from Nov. 14, 2006 Examination for Discovery of Fenton), dated Jun. 18, 2003.

Canadian Action No. 0601-08106, *Aram Systems Ltd.* v. *NovAtel Inc. and Patrick Fenton*, Meeting acceptance from Patrick Fenton (Exhibit D-9 from Nov. 14, 2006 Examination for Discovery of Fenton), dated Jun. 18, 2003.

Canadian Action No. 0601-08106, *Aram Systems Ltd.* v. *NovAtel Inc. and Patrick Fenton*, Handwritten notes re: Aram (Exhibit D-11 from Nov. 14, 2006 Examination for Discovery of Fenton), dated Jun. 18, 2003.

Canadian Action No. 0601-08106, *Aram Systems Ltd.* v. *NovAtel Inc. and Patrick Fenton*, Email from Pat Fenton to Debora Klaus re: Need NDA (Exhibit D-69 from Nov. 27, 2006 Examination for Discovery of D. Klaus), dated Jun. 18, 2003.

Canadian Action No. 0601-08106, *Aram Systems Ltd.* v. *NovAtel Inc. and Patrick Fenton*, Non-Disclosure Agreement (Exhibit D-2 from Nov. 14, 2006 Examination for Discovery of Fenton), dated Jun. 18, 2003.

Canadian Action No. 0601-08106, *Aram Systems Ltd.* v. *NovAtel Inc. and Patrick Fenton*, Aram Geo-X Seismic L1 Opportunity (Exhibit D-14 from Nov. 14, 2006 Examination for Discovery of Fenton).

Canadian Action No. 0601-08106, *Aram Systems Ltd.* v. *NovAtel Inc. and Patrick Fenton*, L1 Land Seismic (Exhibit D-15 from Nov. 14, 2006 Examination for Discovery of Fenton).

Canadian Action No. 0601-08106, *Aram Systems Ltd.* v. *NovAtel Inc. and Patrick Fenton*, E-Mail from Patrick Fenton to Steve Duncombe and Nicholas Schubert re: L1 Seismic Opportunity (Exhibit D-18 from Nov. 14, 2006 Examination for Discovery of Fenton), dated Jul. 11, 2003.

Canadian Action No. 0601-08106, *Aram Systems Ltd.* v. *NovAtel Inc. and Patrick Fenton*, E-mail from Patrick Fenton to Nicholas Schubert/Steve Duncombe re: L1 Seismic Opportunity (Exhibit D-56 from Nov. 17, 2006 Examination for Discovery of Jon Ladd), dated Jul. 11, 2003.

Canadian Action No. 0601-08106, *Aram Systems Ltd.* v. *NovAtel Inc. and Patrick Fenton*, Picture 0103 of NovAtel Production.

Canadian Action No. 0601-08106, *Aram Systems Ltd.* v. *NovAtel Inc. and Patrick Fenton*, Picture (Exhibit D-13 from Nov. 14, 2006 Examination for Discovery of Fenton).

Canadian Action No. 0601-08106, *Aram Systems Ltd.* v. *NovAtel Inc. and Patrick Fenton*, E-mail from Jerry Harmon to David Heidebrecht, dated Jul. 14, 2003.

Canadian Action No. 0601-08106, *Aram Systems Ltd.* v. *NovAtel Inc. and Patrick Fenton*, E-mail from Patrick Fenton to Dave Heidebrecht re: GPS Proposal for Seismic (Exhibit D-19 from Nov. 14, 2006 Examination for Discovery of Fenton), dated Jul. 16, 2003.

Canadian Action No. 0601-08106, *Aram Systems Ltd.* v. *NovAtel Inc. and Patrick Fenton*, Provisional Patent Application, Exhibit D-20 from Nov. 14, 2006 Examination for Discovery of Fenton), dated Jul. 17, 2003.

Canadian Action No. 0601-08106, *Aram Systems Ltd.* v. *NovAtel Inc. and Patrick Fenton*, Land Seismic L1 Opportunity, D04526 [Rev: 0B]—blacklined, dated Jul. 17, 2007.

Canadian Action No. 0601-08106, *Aram Systems Ltd.* v. *NovAtel Inc. and Patrick Fenton*, Land Seismic L1 Opportunity, dated Jul. 17, 2003.

Canadian Action No. 0601-08106, *Aram Systems Ltd.* v. *NovAtel Inc. and Patrick Fenton*, Notes on David Heidebrecht GPS patent (Exhibit P-20 of Nov. 16, 2006 Examination for Discovery of Donald Chamberlain), dated Jul. 18, 2003.

Canadian Action No. 0601-08106, *Aram Systems Ltd.* v. *NovAtel Inc. and Patrick Fenton*, Calendar (Exhibit D-27 from Nov. 14, 2006 Examination for Discovery of Fenton), dated Aug. 2003.

Canadian Action No. 0601-08106, *Aram Systems Ltd.* v. *NovAtel Inc. and Patrick Fenton*, E-Mail from Patrick Fenton to Dave Heidebrecht re: NovAtel Proposal (Exhibit D-24 from Nov. 14, 2006 Examination for Discovery of Fenton), dated Aug. 6, 2003.

Canadian Action No. 0601-08106, *Aram Systems Ltd.* v. *NovAtel Inc. and Patrick Fenton*, E-Mail from David Heidebrecht to Patrick Fenton Re: NovAtel Proposal (Exhibit P-12 from Nov. 15, 2006 Examination for Discovery of Zeljko, dated Aug. 6, 2003.

Canadian Action No. 0601-08106, *Aram Systems Ltd.* v. *NovAtel Inc. and Patrick Fenton*, E-Mail from Patrick Fenton to Dave Heidebrecht re: NovAtel Proposal (Exhibit D-26 from Nov. 14, 2006 Examination for Discovery of Fenton), dated Aug. 6, 2003.

Canadian Action No. 0601-08106, *Aram Systems Ltd.* v. *NovAtel Inc. and Patrick Fenton*, E-mail from David Heidebrecht to Patrick Fenton, with attachments, dated Aug. 6, 2003.

Canadian Action No. 0601-08106, *Aram Systems Ltd.* v. *NovAtel Inc. and Patrick Fenton*, Email from Pat Fenton to David Heidebrecht re: NovAtel Proposal (Exhibit D-62 from Nov. 22, 2006 Examination for Discovery of G. Purves), dated Aug. 7, 2003.

Canadian Action No. 0601-08106, *Aram Systems Ltd.* v. *NovAtel Inc. and Patrick Fenton*, Email exchange between Pat Fenton and David Heidebrecht re: GPS 101 (Exhibit P-52 from Dec. 18, 2006 Examination for Discovery of David Heidebrecht), dated August 7 and 8, 2003.

Canadian Action No. 0601-08106, *Aram Systems Ltd.* v. *NovAtel Inc. and Patrick Fenton*, Notes (Exhibit D-28 to Nov. 14, 2006 Examination for Discovery of Patrick Fenton), dated Aug. 8, 2003.

Canadian Action No. 0601-08106, *Aram Systems Ltd.* v. *NovAtel Inc. and Patrick Fenton*, Notes titled "Telecon—David H." (Exhibit P-34 to Nov. 20, 2006 Examination for discovery of Jerald Harmon), dated Aug. 20, 2003.

Canadian Action No. 0601-08106, *Aram Systems Ltd.* v. *NovAtel Inc. and Patrick Fenton*, Document entitled "Aram Direction" (Exhibit P-1 of Nov. 15, 2006 Examination for Discovery of Zeljko Bacanek).

Canadian Action No. 0601-08106, *Aram Systems Ltd.* v. *NovAtel Inc. and Patrick Fenton*, Document entitled "Aram Direction" with handwritten notes (Exhibit P-2 of Nov. 15, 2006 Examination for Discovery of Zeljko Bacanek).

Canadian Action No. 0601-08106, *Aram Systems Ltd.* v. *NovAtel Inc. and Patrick Fenton*, Document entitled "Aram Direction" with handwritten notes (Exhibit P-3 of Nov. 15, 2006 Examination for Discovery of Zeljko Bacanek), dated Aug. 20, 2003.

Canadian Action No. 0601-08106, *Aram Systems Ltd.* v. *NovAtel Inc. and Patrick Fenton*, Declaration and Power of Attorney of Donald Chamberlain (Exhibit P-19 of Nov. 16, 2006 Examination for Discovery of Donald Chamberlain), dated Sep. 25, 2003.

Canadian Action No. 0601-08106, *Aram Systems Ltd.* v. *NovAtel Inc. and Patrick Fenton*, Handwritten Notes (Exhibit P-65 of Sep. 26, 2007 Examination for Discovery of J. Harmon), dated Oct. 6, 2003.

Canadian Action No. 0601-08106, *Aram Systems Ltd.* v. *NovAtel Inc. and Patrick Fenton*, Handwritten Notes (Exhibit P-66 of Sep. 26, 2007 Examination for Discovery of J. Harmon), dated Oct. 6, 2003.
Canadian Action No. 0601-08106, *Aram Systems Ltd.* v. *NovAtel Inc. and Patrick Fenton*, Handwritten Notes (Exhibit P-67 of Sep. 26, 2007 Examination for Discovery of J. Harmon), dated Oct. 6, 2003.
Canadian Action No. 0601-08106, *Aram Systems Ltd.* v. *NovAtel Inc. and Patrick Fenton*, Seismic_proposal3 .jpg (Exhibit D-12 from Nov. 14, 2006 Examination for Discovery of Fenton), dated Oct. 15, 2003.
Canadian Action No. 0601-08106, *Aram Systems Ltd.* v. *NovAtel Inc. and Patrick Fenton*, Utility Patent Application Transmittal (Exhibit P-54 of Dec. 18, 2006 Examination for Discovery of David Heidebrecht), dated Oct. 25, 2003.
Canadian Action No. 0601-08106, *Aram Systems Ltd.* v. *NovAtel Inc. and Patrick Fenton*, Calendar (Exhibit D-35 from Nov. 14, 2006 Examination for Discovery of Fenton), dated Nov. 2003.
Canadian Action No. 0601-08106, *Aram Systems Ltd.* v. *NovAtel Inc. and Patrick Fenton*, Land Seismic L1 Opportunity, D04526 [Rev: OC]—blacklined, dated Nov. 2003.
Canadian Action No. 0601-08106, *Aram Systems Ltd.* v. *NovAtel Inc. and Patrick Fenton*, Land Seismic L1 Opportunity, D04526 [Rev: OC], dated Nov. 2003.
Canadian Action No. 0601-08106, *Aram Systems Ltd.* v. *NovAtel Inc. and Patrick Fenton*, E-Mail from Steve Duncombe to Graham Purves re: Seismic Report (Exhibit D-34 from Nov. 14, 2006 Examination for Discovery of Fenton), dated Nov. 3, 2003.
Canadian Action No. 0601-08106, *Aram Systems Ltd.* v. *NovAtel Inc. and Patrick Fenton*, Email from Steve Duncombe to Graham Purves re: Seismic Report (Exhibit D-75 from Dec. 12, 2006 Examination for Discovery of S. Duncombe), dated Nov. 3, 2003.
Canadian Action No. 0601-08106, *Aram Systems Ltd.* v. *NovAtel Inc. and Patrick Fenton*, Email from Pat Fenton to Recipient ("Jim") re: benefit of integration of GPS into seismic cables (Exhibit D-77 from Dec. 12, 2006 Examination for Discovery of S. Duncombe), dated Nov. 14, 2003.
Canadian Action No. 0601-08106, *Aram Systems Ltd.* v. *NovAtel Inc. and Patrick Fenton*, Email from Pat Fenton to Recipient ("Jim") re: NovAtel Proposal (Exhibit D- 93 from Dec. 19, 2006 Examination for Discovery of P.C. Fenton), dated Nov. 14, 2003.
Canadian Action No. 0601-08106, *Aram Systems Ltd.* v. *NovAtel Inc. and Patrick Fenton*, Year 2003 Logbook.
Canadian Action No. 0601-08106, *Aram Systems Ltd.* v. *NovAtel Inc. and Patrick Fenton*, Patent Activity Summary (P-61 from Examination for Discovery of Virgil Barfield), dated Jan. 6, 2004.
Canadian Action No. 0601-08106, *Aram Systems Ltd.* v. *NovAtel Inc. and Patrick Fenton*, Calendar (Exhibit D-36 from Nov. 14, 2006 Examination for Discovery of Fenton), dated Feb. 2004.
Canadian Action No. 0601-08106, *Aram Systems Ltd.* v. *NovAtel Inc. and Patrick Fenton*, Declaration and Power of Attorney—Donald Chamberlain and David Heidebrecht (Exhibit P-53 of Dec. 18, 2006 Examination for Discovery of David Heidebrecht). Dated Apr. 6, 2004.
Canadian Action No. 0601-08106, *Aram Systems Ltd.* v. *NovAtel Inc. and Patrick Fenton*, SEC filing including Patrick Fenton employment contract (Exhibit D-112 from Jun. 26, 2007 Examination for Discovery of Patrick Fenton), dated May 26, 2004.
Canadian Action No. 0601-08106, *Aram Systems Ltd.* v. *NovAtel Inc. and Patrick Fenton*, Calendar (Exhibit D-37 from Nov. 14, 2006 Examination for Discovery of Fenton), dated Jun. 2004.
Canadian Action No. 0601-08106, *Aram Systems Ltd.* v. *NovAtel Inc. and Patrick Fenton*, US Patent Application US 2004/0105341 (Exhibit D-87 from Dec. 19, 2006 Examination for Discovery of P.C. Fenton and Exhibit P-18 of Nov. 15, 2006 Examination for Discovery of David Chamberlain), dated Jun. 3, 2004.
Canadian Action No. 0601-08106, *Aram Systems Ltd.* v. *NovAtel Inc. and Patrick Fenton*, Geo-X Meeting (Exhibit D-38 from Nov. 14, 2006 Examination for Discovery of Fenton), dated Jun. 21, 2004.
Canadian Action No. 0601-08106, *Aram Systems Ltd.* v. *NovAtel Inc. and Patrick Fenton*, Geo-X Synchronization and GPS patents applications—Status (Exhibit P-35 of Nov. 20, 2006 Examination for Discovery of Jerald Harmon), dated Jul. 7, 2004.

Canadian Action No. 0601-08106, *Aram Systems Ltd.* v. *NovAtel Inc. and Patrick Fenton*, Email from Jerry Harmon to David Heidebrecht re: NovAtel patent applications (Exhibit P-36 of Nov. 20, 2006 Examination for Discovery of Jerald Harmon), dated Jul. 8, 2004.
Canadian Action No. 0601-08106, *Aram Systems Ltd.* v. *NovAtel Inc. and Patrick Fenton*, Email from Jerry Harmon to David Heidebrecht re: NovAtel patent applications (Exhibit P-14 of Nov. 15, 2006 Examination for Discovery of Zeljko Bacanek). Dated Jul. 12, 2004.
Canadian Action No. 0601-08106, *Aram Systems Ltd.* v. *NovAtel Inc. and Patrick Fenton*, Undertakings of Patrick C. Fenton re: Application of P. Fenton for "A Seismic Measuring System Including GPS receivers" (Exhibit D-91 from Dec. 19, 2006 Examination for Discovery of P.C. Fenton), dated Jul. 15, 2004.
Canadian Action No. 0601-08106, *Aram Systems Ltd.* v. *NovAtel Inc. and Patrick Fenton*, PCT Patent Application (Exhibit D-40 from Nov. 14, 2006 Examination for Discovery of P.C. Fenton), dated Jul. 16, 2004.
Canadian Action No. 0601-08106, *Aram Systems Ltd.* v. *NovAtel Inc. and Patrick Fenton*, Undertakings of Patrick C. Fenton re: Assignment of Patent (Exhibit D-88 from Dec. 19, 2006 Examination for Discovery of P.C. Fenton), dated Oct. 26, 2004.
Canadian Action No. 0601-08106, *Aram Systems Ltd.* v. *NovAtel Inc. and Patrick Fenton*, U.S. Appl. No. 10/891,800—date Jul. 15, 2004 (Exhibit D-39 from Nov. 14, 2006 Examination for Discovery of Fenton). Previously marked as Exhibit PS-3 at Sep. 15, 2006 cross-examination on affidavit of Fenton., dated Feb. 10, 2005.
Canadian Action No. 0601-08106, *Aram Systems Ltd.* v. *NovAtel Inc. and Patrick Fenton*, Aram Aries Specifications (Exhibit P-40 of Nov. 21, 2006 Examination for Discovery of Virgil Barfield), dated Mar. 2005.
Canadian Action No. 0601-08106, *Aram Systems Ltd.* v. *NovAtel Inc. and Patrick Fenton*, US Patent Application re: 2005/0047575 (Exhibit P-22 of Nov. 16, 2006 Examination for Discovery of Donald Chamberlain), dated Mar. 3, 2005.
Canadian Action No. 0601-08106, *Aram Systems Ltd.* v. *NovAtel Inc. and Patrick Fenton*, USPTO Office Action Summary re U.S. Appl. No. 10/693,298, dated Mar. 16, 2005.
Canadian Action No. 0601-08106, *Aram Systems Ltd.* v. *NovAtel Inc. and Patrick Fenton*, Letter from Patricia Sheehan to Chris Chamberlain re: Demand to abandon CIP (Exhibit P-24 of Nov. 16, 2006 Examination for Discovery of Donald Chamberlain) dated Jul. 22, 2005.
Canadian Action No. 0601-08106, *Aram Systems Ltd.* v. *NovAtel Inc. and Patrick Fenton*, Fax to Jerry Harmon from Oliver Kuhn, dated Jul. 28, 2005.
Canadian Action No. 0601-08106, *Aram Systems Ltd.* v. *NovAtel Inc. and Patrick Fenton*, Letter from Patricia Sheehan to Chris Chamberlain re: Follow up on Jul. 22, 2005 letter (Exhibit P-25 of Nov. 16, 2006 Examination for Discovery of Donald Chamberlain), dated Aug. 10, 2005.
Canadian Action No. 0601-08106, *Aram Systems Ltd.* v. *NovAtel Inc. and Patrick Fenton*, Letter from D. Brit Nelson to Patricia Sheehan, dated Aug. 26, 2005.
Canadian Action No. 0601-08106, *Aram Systems Ltd.* v. *NovAtel Inc. and Patrick Fenton*, Letter from D. Brit Nelson to Patricia Sheehan re: Response to Patricia Sheehan's letters of July 22, and Aug. 10, 2005 (Exhibit P-26 of Nov. 16, 2006 Examination for Discovery of Donald Chamberlain), dated Sep. 30, 2005.
Canadian Action No. 0601-08106, *Aram Systems Ltd.* v. *NovAtel Inc. and Patrick Fenton*, Letter from P.A. Sheehan to D.B. Nelson, dated Oct. 12, 2005.
Canadian Action No. 0601-08106, *Aram Systems Ltd.* v. *NovAtel Inc. and Patrick Fenton*, Letter from D.B. Nelson to P.A. Sheehan, dated Oct. 18, 2005.
Canadian Action No. 0601-08106, *Aram Systems Ltd.* v. *NovAtel Inc. and Patrick Fenton*, Information Disclosure statement re Fenton US Patent Application, Dated Oct. 21, 2005.
Canadian Action No. 0601-08106, *Aram Systems Ltd.* v. *NovAtel Inc. and Patrick Fenton*, Letter from P.A. Sheehan to D.B. Nelson, dated Oct. 25, 2005.
Canadian Action No. 0601-08106, *Aram Systems Ltd.* v. *NovAtel Inc. and Patrick Fenton*, Letter from D.B. Nelson to P.A. Sheehan, dated Dec. 9, 2005.

Canadian Action No. 0601-08106, *Aram Systems Ltd.* v. *NovAtel Inc. and Patrick Fenton*, Canadian Patent Application (Exhibit D-41 from Nov. 14, 2006 Examination for Discovery of Fenton), dated Jan. 16, 2006.

Canadian Action No. 0601-08106, *Aram Systems Ltd.* v. *NovAtel Inc. and Patrick Fenton*, EPO Patent Application (Exhibit D-43 from Nov. 14, 2006 Examination for Discovery of Fenton), dated Mar. 8, 2006.

Canadian Action No. 0601-08106, *Aram Systems Ltd.* v. *NovAtel Inc. and Patrick Fenton*, Letter from Jon Ladd (NovAtel Inc.) to Chris Chamberlain (Aram Systems) re: US 2005/0033519 and US 2005/0047275 (Exhibit D-59 from Nov. 17, 2006 Examination for Discovery of Jon Ladd), dated Apr. 3, 2006.

Canadian Action No. 0601-08106, *Aram Systems Ltd.* v. *NovAtel Inc. and Patrick Fenton*, Information disclosure statement by Applicant re Fenton US Patent Application, dated May 23, 2006.

Canadian Action No. 0601-08106, *Aram Systems Ltd.* v. *NovAtel Inc. and Patrick Fenton*, Undertakings of Patrick C. Fenton re: Application by P. Fenton for Notice of Allowability (Exhibit D-89 from Dec. 19, 2006 Examination for Discovery of P.C. Fenton), dated May 23, 2006.

Canadian Action No. 0601-08106, *Aram Systems Ltd.* v. *NovAtel Inc. and Patrick Fenton*, E-mail from Nicholas Schubert to David Heidebrecht, dated Jun. 12, 2003.

Canadian Action No. 0601-08106, *Aram Systems Ltd.* v. *NovAtel Inc. and Patrick Fenton*, Interview Summary re Jul. 27, 2006 conference call, dated Jul. 20, 2006.

Canadian Action No. 0601-08106, *Aram Systems Ltd.* v. *NovAtel Inc. and Patrick Fenton*, Interview Summary re Teleconference between Patricia Sheehan and USPTO, dated Jul. 27, 2006.

Canadian Action No. 0601-08106, *Aram Systems Ltd.* v. *NovAtel Inc. and Patrick Fenton*, Amended Claims of Fenton US Patent Application (Exhibit D-44 from Nov. 14, 2006 Examination for Discovery of Fenton), also previously marked as Exhibit DS-6 of Fenton Sep. 15, 2006 cross-exam), dated Jul. 28, 2006.

Canadian Action No. 0601-08106, *Aram Systems Ltd.* v. *NovAtel Inc. and Patrick Fenton*, Notice of Allowability regarding Fenton US Patent, dated Aug. 2, 2006.

Canadian Action No. 0601-08106, *Aram Systems Ltd.* v. *NovAtel Inc. and Patrick Fenton*, Undertakings of Patrick C. Fenton re: Notice of Allowance and Fees Due (Exhibit D-90 from Dec. 19, 2006 Examination for Discovery of P.C. Fenton), dated Aug. 7, 2006.

Canadian Action No. 0601-08106, *Aram Systems Ltd.* v. *NovAtel Inc. and Patrick Fenton*, US Deformation Monitoring Patent Application, U.S. Appl. No. 11/502,086, dated Aug. 10, 2006.

Canadian Action No. 0601-08106, *Aram Systems Ltd.* v. *NovAtel Inc. and Patrick Fenton*, Affidavit of David Heidebrecht sworn Aug. 11, 2006.

Canadian Action No. 0601-08106, *Aram Systems Ltd.* v. *NovAtel Inc. and Patrick Fenton*, NDA created Jun. 18, 2003 Geo-X Properties (Exhibit D-3 from Nov. 14, 2006 Examination for Discovery of Fenton), dated Aug. 21, 2003.

Canadian Action No. 0601-08106, *Aram Systems Ltd.* v. *NovAtel Inc. and Patrick Fenton*, L1 land Seismic Opportunity (Exhibit P-51 of Dec. 18, 2006 Examination for Discovery of David Heidebrecht), dated Aug. 25, 2006.

Canadian Action No. 0601-08106, *Aram Systems Ltd.* v. *NovAtel Inc. and Patrick Fenton*, Transmittal Letter of Explanation for Divisional Application (Exhibit P-39 from Nov. 20, 2006 Examination for Discovery of Jerald Harmon), dated Oct. 2, 2006.

Canadian Action No. 0601-08106, *Aram Systems Ltd.* v. *NovAtel Inc. and Patrick Fenton*, Continuation Application (Exhibit P-38 to Nov. 20, 2006 Examination for Discovery of Jerald Harmon), dated Oct. 2, 2006.

Canadian Action No. 0601-08106, *Aram Systems Ltd.* v. *NovAtel Inc. and Patrick Fenton*, United States Patent 7,117,094—Issued Oct. 3, 2006.

Canadian Action No. 0601-08106, *Aram Systems Ltd.* v. *NovAtel Inc. and Patrick Fenton*, File Wrap history of Fenton US patent application, dated Oct. 4, 2006.

Canadian Action No. 0601-08106, *Aram Systems Ltd.* v. *NovAtel Inc. and Patrick Fenton*, Canadian Patent Abstract (Exhibit D-42 from Nov. 14, 2006 Examination for Discovery of Fenton), dated Oct. 6, 2006.

Canadian Action No. 0601-08106, *Aram Systems Ltd.* v. *NovAtel Inc. and Patrick Fenton*, Email from Jerry Harmon to Virgil Barfield et. al re: Follow up information from Apr. 3, 2006 meeting (Exhibit P-37 of Nov. 20, 2006 Examination for Discovery of Jerald Harmon), dated Apr. 3, 2006.

Canadian Action No. 0601-08106, *Aram Systems Ltd.* v. *NovAtel Inc. and Patrick Fenton*, Responses to Undertakings of Patrick Charles Fenton (Exhibit D-78 from Dec. 12, 2006 Examination for Discovery of S. Duncombe), dated Nov. 14, 2006.

Canadian Action No. 0601-08106, *Aram Systems Ltd.* v. *NovAtel Inc. and Patrick Fenton*, Amended Responses to Undertakings of Patrick C. Fenton (Exhibit D-92 from Dec. 19, 2006 Examination for Discovery of P.C. Fenton), dated Nov. 14, 2006.

Canadian Action No. 0601-08106, *Aram Systems Ltd.* v. *NovAtel Inc. and Patrick Fenton*, Cell phone usage of David Heidebrecht (Exhibit P-50 of Dec. 18, 2006 Examination for Discovery of David Heidebrecht), dated Nov. 14, 2006.

Canadian Action No. 0601-08106, *Aram Systems Ltd.* v. *NovAtel Inc. and Patrick Fenton*, Radio Report and Status (Exhibit P-4 from Nov. 15, 2006 Examination for Discovery of Zeljko Bacanek), dated 2003.

Canadian Action No. 0601-08106, *Aram Systems Ltd.* v. *NovAtel Inc. and Patrick Fenton*, Responses to Undertakings of Jonathan W. Ladd (Exhibit D-86 from Dec. 12, 2006 Examination for Discovery of S. Duncombe), dated Nov. 17, 2006.

Canadian Action No. 0601-08106, *Aram Systems Ltd.* v. *NovAtel Inc. and Patrick Fenton*, Responses to Undertakings of Jonathan W. Ladd (Exhibit D-99 from Dec. 19, 2006 Examination for Discovery of P.C. Fenton), dated Nov. 17, 2006.

Canadian Action No. 0601-08106, *Aram Systems Ltd.* v. *NovAtel Inc. and Patrick Fenton*, Record of entry/exit into facility (Exhibit P-47 of Dec. 18, 2006 Examination for Discovery of David Heidebrecht), dated Jun. 19, 2003.

Canadian Action No. 0601-08106, *Aram Systems Ltd.* v. *NovAtel Inc. and Patrick Fenton*, Responses to Undertakings of Graham Purves (Exhibit D-97 from Dec. 19, 2006 Examination for Discovery of P.C. Fenton), dated Nov. 22, 2006.

Canadian Action No. 0601-08106, *Aram Systems Ltd.* v. *NovAtel Inc. and Patrick Fenton*, Responses to Undertakings of Farlin Halsey (Exhibit D-95 from Dec. 19, 2006 Examination for Discovery of P.C. Fenton), dated Nov. 24, 2006.

Canadian Action No. 0601-08106, *Aram Systems Ltd.* v. *NovAtel Inc. and Patrick Fenton*, Interview Summary (Exhibit P-55 from Dec. 18, 2006 Examination for Discovery of David Heidebrecht). Dated Nov. 27, 2006.

Canadian Action No. 0601-08106, *Aram Systems Ltd.* v. *NovAtel Inc. and Patrick Fenton*, Amended Responses to Undertakings of Nicholas Schubert (Exhibit D-96 from Dec. 19, 2006 Examination for Discovery of P.C. Fenton), November 28 and 29, 2006.

Canadian Action No. 0601-08106, *Aram Systems Ltd.* v. *NovAtel Inc. and Patrick Fenton*, USPTO office Action re Aram CIP filing, dated Feb. 8, 2007.

Canadian Action No. 0601-08106, *Aram Systems Ltd.* v. *NovAtel Inc. and Patrick Fenton*, USPTO office action re Deformation Monitoring Patent (Exhibit D-105 from Jun. 26, 2007 Examination for Discovery of P.C. Fenton), dated Mar. 28, 2007.

Canadian Action No. 0601-08106, *Aram Systems Ltd.* v. *NovAtel Inc. and Patrick Fenton*, Utility Patent Application Transmittal, dated Apr. 16, 2007.

Canadian Action No. 0601-08106, *Aram Systems Ltd.* v. *NovAtel Inc. and Patrick Fenton*, Correspondence from D. Brit Nelson to Patricia A. Sheehan Re: Declaration for Utility or Design Patent Application, dated Apr. 16, 2007.

Canadian Action No. 0601-08106, *Aram Systems Ltd.* v. *NovAtel Inc. and Patrick Fenton*, Correspondence from NovAtel EPO Patent Agent to EPO, dated May 11, 2007.

Canadian Action No. 0601-08106, *Aram Systems Ltd.* v. *NovAtel Inc. and Patrick Fenton*, U.S. Appl. No. 11/835,520 filed by Patrick Fenton, dated Aug. 8, 2007.

Canadian Action No. 0601-08106, *Aram Systems Ltd.* v. *NovAtel Inc. and Patrick Fenton*, Current Fenton EPO patent claims, dated Sep. 2007.

Canadian Action No. 0601-08106, *Aram Systems Ltd.* v. *NovAtel Inc. and Patrick Fenton*, Current Fenton Japanese patent claims, dated Sep. 2007.
Canadian Action No. 0601-08106, *Aram Systems Ltd.* v. *NovAtel Inc. and Patrick Fenton*, Current Fenton Norwegian patent claims, dated Sep. 2007.
Canadian Action No. 0601-08106, *Aram Systems Ltd.* v. *NovAtel Inc. and Patrick Fenton*, US Patent 7,269,095 issued to Donald Chamberlain et al., dated Sep. 11, 2007.
Deposition Transcript, Barfield, V.H., dated May 22, 2007.
Deposition Transcript, Fenton, P.C., dated Jun. 26, 2007.
Trial Transcripts, vol. 01.
Trial Transcripts, vol. 02.
Trial Transcripts, vol. 03.
Trial Transcripts, vol. 04.
Trial Transcripts, vol. 05.
Trial Transcripts, vol. 06.
Trial Transcripts, vol. 07.
Trial Transcripts, vol. 08.
Trial Transcripts, vol. 09.
Trial Transcripts, vol. 10.
Trial Transcripts, vol. 11.
Trial Transcripts, vol. 12.
Trial Transcripts, vol. 13.
Trial Transcripts, vol. 14.
Trial Transcripts, vol. 15.
Trial Transcripts, vol. 16.
Trial Transcripts, vol. 17.
Trial Transcripts, vol. 18.
Blewitt, Geoffrey, Article entitled Advances In Global Positioning System Technology for Geodynamics Investigations: 1978-1992, Contributions of Space Geodesy to Geodynamics: ?Technology Geodynamics 25, pp. 195-213.
Paper entitled Seismic Surveying under Tree Canopy Using Ashtech GG-24 GPS/Glonass Receivers and Waypoint's GrafNav Post-Processing Software, Mar. 2000.
Krasner, G.M. and Riley, W., Article entitled "Position Determination Using Hybrid GPS/Cellphone Ranging", Institute of Navigation Presentation, 2002.
Djuknic, G.M. and Richton, R.E., Article entitled "Geolocation and Assisted GPS", Feb. 2001, pp. 123-124.
NovAtel web page printout, "Post-processing Software Packages", www.novatel.com/products/waypoint.pps.htm.
Navcom web page printout, "Controller Software Solutions", www.navocmtech.com/products/software.cfm, circa 2004.
Lamance, J. et al., Article entitled "Assisted GPS: A Low-Infrastructure Approach", printed from GPS World website, Mar. 1, 2002, pp. 1-5.
Behr, J.A. Powerpoint Presentation printout entitled Global Positioning System (GPS) Applications for Deformation Monitoring, Geotechnical Instrumentation for Field Measurements, University of Florida's Division of Continuing Education, Mar. 12, 2001, pp. 1-40.
Aram Closing Submissions filed Nov. 21, 2007.
Aram Book of Authorities.
NovAtel Post-Trial Brief filed Nov. 21, 2007.
NovAtel Book of Authorities (3 volumes).
Aram Rebuttal Submissions filed Dec. 7, 2007.
Aram Book of Authorities (3 volumes).
NovAtel Rebuttal Brief filed Dec. 7, 2007.
Reasons for Judgment of the Honourable Mr. Justice Alan D. Macleod dated Jul. 23, 2008.
Civil Notice of Appeal dated Aug. 8, 2008.
Judgment Roll dated Aug. 12, 2008.
Factum of the Appellant/Plaintiff Aram Systems Ltd. With Respect to the Reasons for Judgment of the Honourable Mr. Justice Alan D. Macleod Dated Jul. 23, 2008 Filed Sep. 30, 2008.
Appendices to the Factum of the Appellant/Plaintiff Aram Systems Ltd. With Respect to the Reasons for Judgment of the Honourable Mr. Justice Alan D. Macleod Dated Jul. 23, 2008 Filed Sep. 30, 2008.
Factum of the Respondents NovAtel Inc. and Patrick C. Fenton Filed Oct. 20, 2008.
Memorandum of Judgment dated Jul. 31, 2009.

* cited by examiner

SEISMIC MEASURING SYSTEM INCLUDING GPS RECEIVERS

CROSS-REFERENCE TO RELATED APPLICATIONS

The present is a continuation of commonly assigned U.S. patent application Ser. No. 11/502,086, filed Aug. 10, 2006, now U.S. Pat. No. 7,526,386, which is a continuation of U.S. patent application Ser. No. 10/891,800, now U.S. Pat. No. 7,117,094, which was filed on Jul. 15, 2004, by Patrick C. Fenton for a SEISMIC MEASURING INCLUDING GPS RECEIVERS and is hereby incorporated by reference.

FIELD OF THE INVENTION

The invention relates generally to seismic data collection systems and, in particular, to systems for collecting and analyzing three-dimensional seismic data.

BACKGROUND OF THE INVENTION

Systems for analyzing three-dimensional seismic data collect seismic measurements from configurations of geophones that are attached to and communicate with digitizer units (DUs), which that produce signals that correspond to the seismic measurements. The DUs, which are placed at selected locations along cables that span a site of interest, take readings from the configurations of geophones and send corresponding signals over the cables to a data recording and control center. The data is used to determine, for example, the likelihood that oil reserves are present on the site. A typical site may include thousands of DUs, each with an associated configuration of geophones.

Setting up and operating the measurement system is both time consuming and complex. The locations of the DUs must be known to within tight vertical and horizontal accuracy limits, and generally, the locations of the respective DUs are individually determined using optical survey techniques, GPS RTK "back-pack" systems or GPS/INS systems. In addition, the sites can no longer be cleared, that is, foliage cannot be removed at the selected locations of the DUs, and thus, the process of determining the locations of the DUs is made even more time consuming and complex when lines of sight are blocked.

The geophone readings taken by the DUs must be synchronized to within tight timing limits. In prior known systems, timing signals are sent along the cables and readings are taken at the various DUs in response to the signals. Accordingly, the lengths of the respective cables are limited, to avoid associated timing signal delays. Consequently, the area that can be tested at a given time is also limited by the lengths of the cables.

What is needed is a system that can be set up in a less time consuming manner and operate accurately over larger areas.

SUMMARY OF THE INVENTION

A system for analyzing three-dimensional seismic data includes, in addition to the DUs, the geophones and the data recording and control center, a base GPS receiver and an associated antenna with a substantially unrestricted view of the sky and at the respective DUs low-power slave GPS receivers that acquire and track GPS satellite signals using tracking assistance information provided by the base GPS receiver. Using the tracking assistance information, the slave GPS receivers can acquire and track GPS satellite signals that may be relatively weak at the receivers, due to conditions at the site, such as foliage canopies, and so forth. Further, as discussed below, the system operates the slave GPS receivers and processes associated range information such that the precise positions of the respective DUs are calculated and synchronized timing information is provided to each DU, even if the sky views of the respective slave GPS receivers are substantially reduced.

To determine the precise positions of a given DU, the associated slave GPS receiver uses the tracking assistance information to acquire and track GPS satellite signals from those satellites that are in the receiver's view. The slave GPS receiver then produces associated range information and provides the information to the data recording and control center. The data recording and control center collects the range information over an extended period of time, such as hours or days, as necessary. The center then batch processes the information, to produce a single computed position. By processing the information collected over an extended period of time, the system can determine the position of the slave GPS receiver to within the tight vertical and horizontal tolerances required for seismic measurements, as long as the slave GPS receiver is able to observe and collect data from at least two satellites simultaneously for 3 or 4 relatively short time intervals at various sky positions during the extended period. The batch processing thus eliminates the need to continuously track the GPS satellite signals and/or to track the signals from the same set of satellites over the respective intervals.

The data recording and control center thereafter provides the precise computed positions to the respective slave GPS receivers. The slave GPS receivers then use the position information and the tracking assistance information provided by the base GPS receiver to produce synchronized timing signals for use in controlling the collection of seismic data from the geophones. The timing signals include a 1 pulse per second strobe, which is tied to the codes in the GPS satellite signals, and the associated RS-232 time tag data. The timing signals remain synchronized over the system as long as a number of the slave GPS receivers individually continue to track the signals from at least one GPS satellite during a geophone data gathering operation. The slave GPS receivers that are tracking during the data gathering operation provide synchronized timing signals over the connecting cables to the neighboring non-tracking slave GPS slave receivers. Accordingly, the limit on cable lengths is essentially between the respective slave GPS receivers. This is in contrast to known prior systems in which the limit on the cable length must be met between the respective DUs and the control center.

The system thus provides precise positioning information for the respective DUs and synchronized timing signals for the collection of data from the geophones using relatively inexpensive slave GPS receivers that have their acquisition and tracking performance enhanced by the tracking assistance information provided by a single base GPS receiver. Further, the system produces the precise positioning information and the synchronized timing signals in an environment in which GPS receivers operating in a conventional manner typically can not do so, because of, for example, foliage cover that interferes with the receipt of the GPS satellite signals at the respective GPS receivers.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
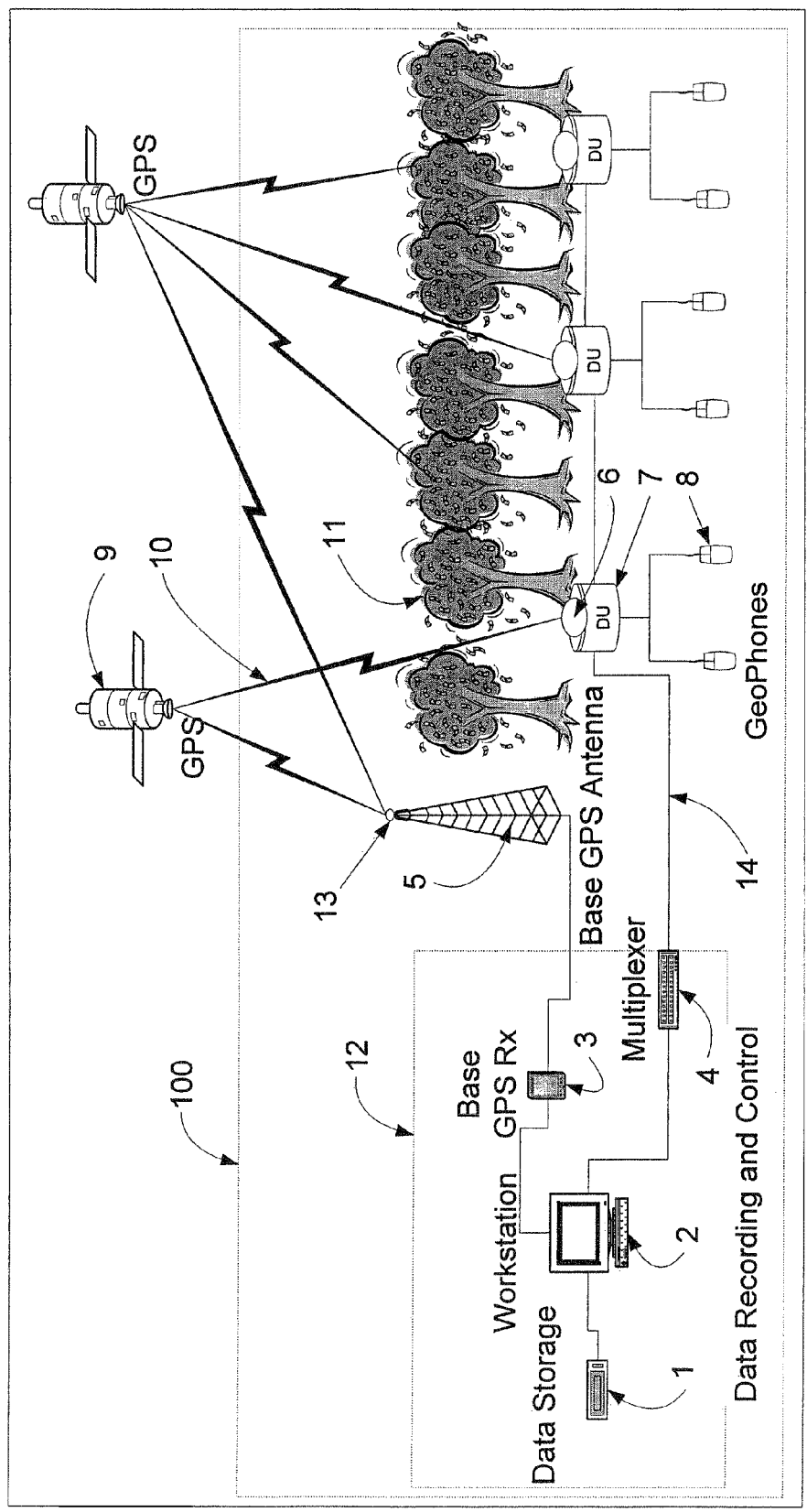
FIG. 1 is a functional block diagram of a seismic measuring system constructed in accordance with the invention.

Referring to the FIG. 1, a system 100 for collecting and analyzing seismic measurements is depicted. The system 100 includes a plurality of geophones 8 that supply seismic data to a data recording and control center 12 through DUs 7. The DUs are located in selected locations over a site of interest and are connected to the center by cables 14. The center 12 includes one or more workstations 2 and data storage devices 1 that process and store the data collected by the geophones. The signals from various cables 14 (only one of which is shown in the drawing) are supplied to the one or more workstations 2 through a multiplexer 4, which operates in a conventional manner. The system generally includes thousands of DUs, each with an associated configuration of geophones.

The data recording and control center 12 further includes a base Global Positioning System (GPS) receiver 3 that receives signals from various GPS satellites 9 using a base GPS antenna 13, which is positioned to have a clear view of the sky. As depicted in the drawing, an elevated tower 5 may be necessary to provide the GPS antenna 13 with a clear sky view. Slave GPS receivers 6, which may be relatively inexpensive low power L1 receivers, are located at the respective DUs 7. As discussed in more detail below, the slave GPS receivers 6 provide range information to the data recording and control center 12 and synchronized data collection timing signals to the DUs 7. As also depicted in the drawing, certain or all of the slave GPS receivers 6 are located under or near various trees 11, such that at any given time the signals 10 from GPS satellites 9 in certain sky locations may be unavailable or weakened at various slave GPS receivers.

The base GPS receiver 3 acquires and tracks the signals 10 from each of the GPS satellites in view, and at various times provides to the slave GPS receivers related tracking assistance information. The base GPS receiver provides as the tracking assistance information at least a list of the satellites then in view, and the associated Doppler frequency offsets and broadcast data symbols. The slave GPS receivers then use the tracking assistance information to acquire and track the signals from the various satellites using tracking loops with relatively narrow bandwidths. This allows the respective slave GPS receivers to utilize GPS satellite signals that are weak at the receivers. For example, the slave GPS receivers may acquire and track signals that are 10 to 15 dB lower than the signals required by GPS receivers operating in a conventional manner, that is, without tracking assistance.

Each slave GPS receiver 6 produces range information based on the satellite signals that the receiver can track at a given time, and the receiver provides the range information to the data recording and control center 12. The range information includes both code and carrier timing information for each of the signals being tracked. The center collects the range information over an extended period of time, for example, hours, days or weeks, and then batch processes the collected information, to calculate the precise latitude, longitude and height of the receiver. The center also calculates the quality of the collected range information, to ensure that the information used in the batch position calculations is sufficiently reliable, as discussed in more detail below.

As long as the slave GPS receiver has tracked at least two satellites simultaneously for 3 or 4 relatively short time intervals at different sky locations during the extended period, the batch processing of the range information calculates the position of the slave GPS receiver to within the tolerances required for seismic measurement. The batch processing thus allows the system to calculate the precise positions of the slave receivers without requiring that the slave GPS receiver continuously track the GPS satellite signals from multiple satellites and/or track the signals from the same set GPS satellites.

The data recording and control center 12 batch processes the range data collected from a given fixed-position slave GPS receiver, to compute a single position, i.e., latitude, longitude and height, and an associated position covariance. The batch processing involves multiple passes through the collected range data, with a first pass using all of the collected data, that is, all of the pseudorange and carrier phase information, to produce a global position estimate that is expected to be accurate to within 30 to 60 meters. As discussed, the accuracy is adversely affected by the overall quality of the range data. The range data is produced based on signals from the satellites that are in the view of the receiver at various times over an extended time period, that is, over a number of hours, days, and so forth. Generally, it is expected that range data will be collected over a period of between 8 and 24 hours. With slave GPS receiver's restricted view of the sky, because of foliage or other partial coverage, the receiver may not have the same set of satellites in view over much of the extended period and/or may not have more than one satellite in view at particular times. Further, some of satellite signals may be distorted by large multipath components attributed to signals that are reflected to the receiver by the foliage or other nearby obstructions.

As a next pass through the data, the data recording and control center refines the calculated position and position covariance using only the carrier phase measurements, which are less susceptible to multipath interference. The receiver starts with the estimated position and position covariance from the first pass and, in what is a computation intensive manner, resolves carrier cycle ambiguities to determine updated estimated positions and associated position covariances. The estimated position and the associated position covariance are updated at every code epoch in which two or more satellites are in view of the receiver, that is, when double differences can be calculated to resolve carrier cycle ambiguities. The accuracy of the position estimate at the end of the second pass is expected to be within 3 to 6 meters, with most of the error attributable to the height component.

The third pass through the data holds the position and position covariance fixed to the best estimate from pass two and, based on the carrier phase measurement, looks for perceived movement. The processing then selects for further processing data that are associated with little or no perceived movement. The processing may also selectively weight various data used in the further processing.

More specifically, the third pass processing calculates residuals of the double differenced carrier phase measurements with respect to the fixed position, and determines if the residuals show perceived movement. The residuals are accumulated over intervals in which there is continuity in the carrier phase measurement, that is, over periods in which there is no loss of lock or cycle slip. The processing determines measurement data is valid over a given interval if the sum of the squares of the residuals falls below a normalized threshold, and also, the rate of growth of the sum of the squares falls below a predetermined threshold. If both conditions are not met, the processing flags the associated series of carrier measurements as invalid for the entire interval between cycle slips. The processing may also assign weights to the respective measurements that are deemed valid. Thus, the processing may de-weight certain measurements to prevent correlated multipath errors, i.e., non-white noise errors, from adversely affecting the further processing. The de-weighting may, for example, take the form of using fewer of the measurements over a particular code epoch, i.e., one out of every four measurements, or using a larger standard deviation in the associated calculations.

The processing then recalculates the estimated position based on the results of the third pass. The system thus eliminates from the calculations the measurements that are is flagged as invalid and assigns appropriate weights to the remaining measurements, and produces a new position estimate and associated position covariance.

The processing system next holds the position and position covariance fixed at the new estimates and repeats the third pass, that is, the processing step of determining the validity of and weightings for the measurements based on the associated residuals. In this step the system may accept as good measurements particular measurements that showed perceived movement relative to the prior estimated position and position covariance but do not with respect to the new estimates. The processing system then determines a next estimated position and associated position covariance using the updated weighting and validity determinations, and continues iterating in this manner, i.e., determining new weightings and a next estimate of position, until the estimated height changes by less than a predetermined threshold between iterations.

The batch processing operations are discussed in more detail in co-pending U.S. Provisional Application Ser. No. 60/588,099, entitled METHOD FOR POSITIONING USING GPS IN A RESTRICTIVE COVERAGE ENVIRONMENT, and further identified by attorney matter number 016437-0218R, which is assigned to a common assignee and incorporated herein in its entirety by reference.

The batch processing performed by the system differs substantially from the processing performed in known assisted GPS, or A-GPS, systems, which also referred to as e911 systems. The A-GPS systems allow a GPS receiver in a cellular telephone essentially to determine an "instantaneous" position fix to within approximately 100 meters based on fast acquisition and tracking of signals simultaneously from 3 or 4 GPS satellites. The A-GPS systems are not designed to and do not meet the tight tolerances required for seismic measuring.

Referring still to FIG. 1, once the data recording and control center 12 has calculated the positions of the respective slave GPS receivers 6 to within the necessary tolerances, the center provides the positions to the receivers. The slave GPS receivers 6 then use their positions and the tracking assistance information supplied by the base GPS receiver to produce synchronized 1 pulse per second timing signals that correspond to the timing of the codes in the received GPS satellite signals and also produce the associated RS-232 time tag message associated with the 1 pulse per second signal. The DUs use the timing signals (1 pulse per second and time tag message) to control the collection of data from the geophones. A given slave GPS receiver need only track the signals from a single GPS satellite at any given time in order to produce timing signals that are tied to the GPS codes, and thus, the DUs and associated slave GPS receivers should be able to maintain their timing signals in synchronism across the entire system.

If at any given time one or more slave GPS receivers 6 fail to track the satellite signals, the system will still be able to gather data from the geophones by providing synchronized timing signals from nearby tracking slave GPS receivers to the non-tracking slave GPS receivers over the connecting cables 14. The slave GPS receivers may each send timing information over the cables, such that a given receiver can use its own timing information or the received timing information, as appropriate. The received timing signals remain synchronized as long as the receiver providing the timing signals is within approximately 1 kilometer of the receiver that must rely on the received signals.

An alternative configuration of the system may use one of the receivers situated at the DUs as the source of the tracking assistance information. Thus, if a DU is located where there is a relatively clear view of the sky, the installer may configure this receiver to supply the tracking assistance information to the various slave GPS receivers. Accordingly, in this configuration, the base GPS receiver 3, base GPS antenna 13 and the elevating tower 5 may not be necessary. As appropriate, the system may instead use two or more of the receivers situated at the DUs as sources of the tracking assistance information, with selected receivers being the source of the tracking assistance information for GPS satellites in particular regions of the sky.

Figure 2:
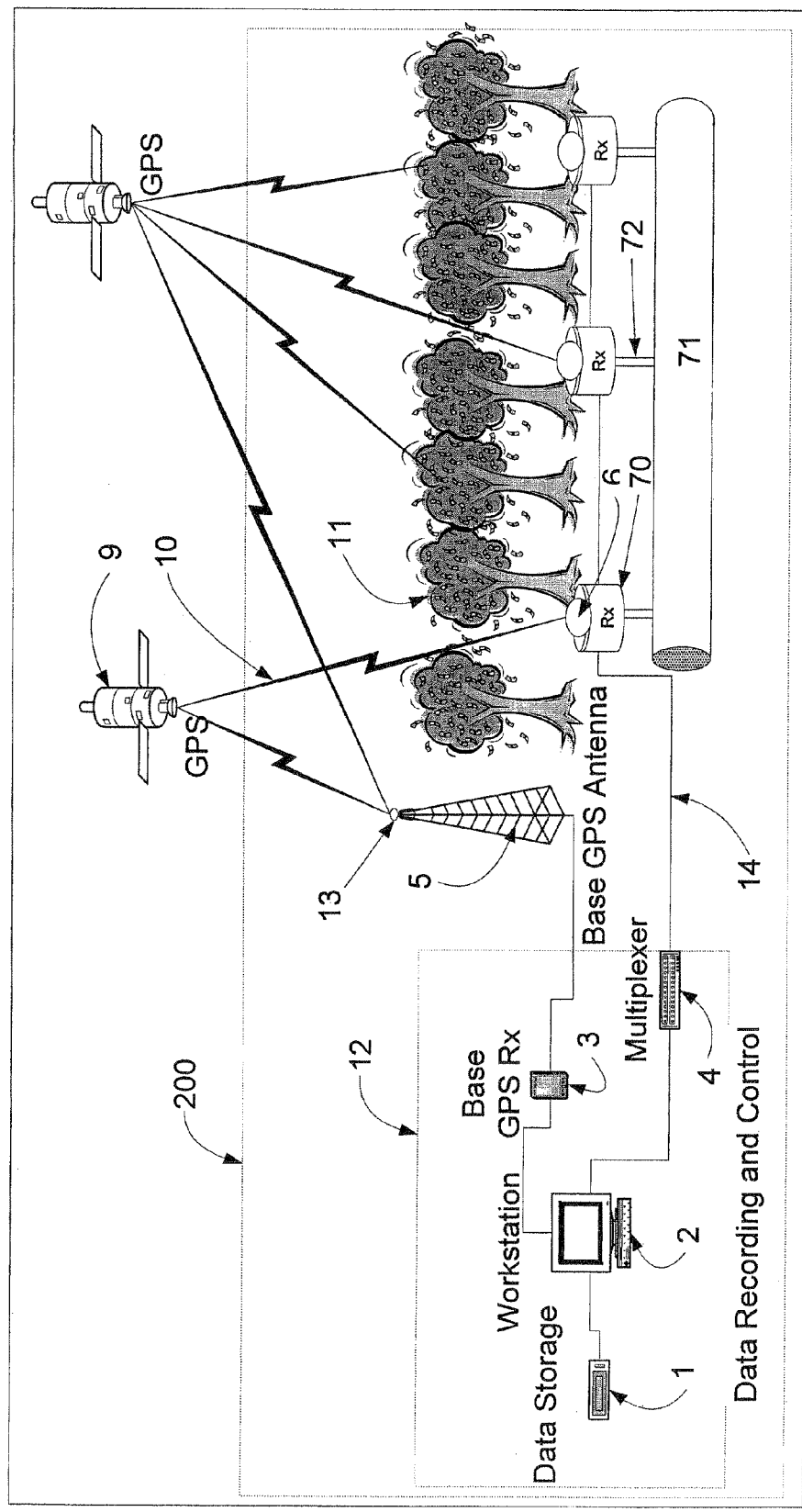
FIG. 2 is a functional block diagram of a deformation monitoring system constructed in accordance with the invention.

The system, in either configuration, may also be used to perform deformation monitoring. Deformation monitoring checks the movements of essentially fixed points of interest, such as bridges, dams, buildings, pipelines, and so forth, that may be located on potentially unstable ground. Referring now to FIG. 2, the deformation monitoring system 200 includes one or more base GPS receivers 3 with clear views to the sky that provide tracking assistance information and a plurality of slave GPS receivers 6 that act as monitoring devices. The slave GPS receivers are rigidly attached by poles 72 to a pipe 71, which is buried. Signal receivers 70 provide signals to and receive signals from the GPS receivers 6 and the cables 14. The data recording and control center 12 collects range information from the respective base and slave GPS receivers and batch processes the range information, to determine the precise positions of the respective slave GPS receivers along the pipe 71. The respective slave receivers continue to track the satellite signals, with the tracking assistance provided by the base GPS receiver or receivers, and provide range information to the data recording and control center. The center then determines if there are changes in the positions of the respective slave GPS receivers that indicate deformation.

The signal receivers 70 in the deformation monitoring system may also provide to the data recording and control center 12 other types of measurement data from secondary measurement devices, such strain gauges or tilt meters (not shown) that are attached to pipe 71. For this type of data, the data recording and control center may provide timing signals over the cables 14 to time tag movement "events," such as earthquakes. Should the system require measurement timing signals with more precision than can be provided over the cables, for the measurements made by these or other secondary devices, the system may instead use timing signals produced by the slave GPS receivers.

The system described above, whether used for seismic measurement or deformation monitoring, has as one of its advantages locally producing, at each slave GPS receiver, timing signals that are synchronized over the entire system. As discussed, cable length limitations are avoided by providing timing signals from a neighboring slave GPS receiver to a slave GPS receiver that has lost its timing signal by failing to continuously track the GPS satellites. Further, the slave GPS receivers produce the timing signals in environments with restricted sky views, using the tracking assistance information provided by the base GPS receivers, and thus, can operate in areas in which conventional GPS receivers are ineffective.

These advantages are provided regardless of how the precise positions of the slave GPS receivers are determined. Thus, certain or all of the advantages of the system are achieved using other batch processing techniques to determine the precise positions of the slave GPS receivers or determining the positions using conventional, though time and labor intensive, methods such as surveying.

Also, the system may operate without providing the tracking assistance information to the slave GPS receivers. In these operations the base GPS receiver provides to the data recording and control center range information, that is, pseudorange and carrier measurement information, to be used in the double difference calculations made during the batch processing. The slave GPS receivers initially operate in a conventional manner to acquire and track satellite signals from the satellites in view. The slave GPS receivers provide the associated range information to the data recording and control center and the center performs the batch processing, as discussed above. Thereafter, the center provides the slave GPS receivers with the position information, and the slave GPS receivers continue to acquire and track the satellite signals based on this position information. The slave GPS receivers operating in this manner, i.e., without tracking assistance, will have more difficulty continuously tracking the satellite signals. Accordingly, more of the slave GPS receivers will require timing signals from nearby receivers in order to provide synchronized timing signals to the DUs. However, the system operating in this manner is able to determine the precise positions of the slave GPS receivers, although the length of the extended period required to collect the range information will be longer when the tracking assistance is not provided to the slave GPS receivers.

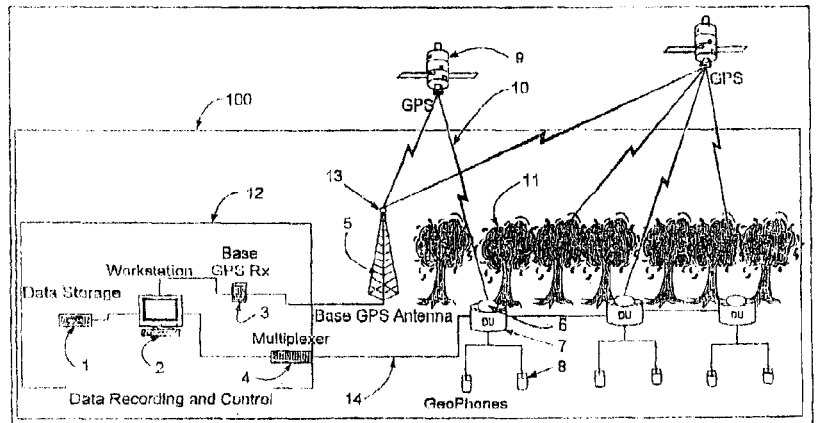

What is claimed is:

1. A system comprising
   one or more base GPS receivers and associated antennas with substantial views of the sky, the base GPS receivers acquiring and tracking GPS satellite signals and producing range data;
   a plurality of fixed-position GPS receivers, with one or more of the fixed-position GPS receivers operating in locations in which at various times the signals from GPS satellites in certain sky locations are unavailable, weakened or corrupted by multipath at the one or more fixed-position GPS receivers, the fixed-position GPS receivers acquiring and tracking GPS satellite signals and producing range data; and
   a data recording and control center for
      collecting the range data from the one or more base receivers and the fixed-position receivers over an extended period of time and batch processing the information to determine which respective range data are valid and calculate the positions of the respective fixed-position GPS receivers using the valid range data, and
      recording the positions of the respective fixed-position receivers.

2. The system of claim 1 wherein the data recording and control center further returns the positions to the respective fixed-position GPS receivers.

3. The system of claim 1 wherein the data recording and control center determines valid range data by determining that range data which corresponds to perceived movement is invalid.

4. The system of claim 1 wherein the data recording and control center determines the positions using calculations involving carrier phase measurements.

5. The system of claim 1 wherein the data recording and control center uses range data produced by the one or more base GPS receivers in double difference calculations during the batch processing.

6. The system of claim 1 wherein the data recording and control center utilizes range data accumulated over intervals in which there is continuity in the carrier phase measurements and determines the range data is invalid over a given interval if the range data are associated with perceived movement.

7. A system comprising
   a plurality of base GPS receivers that together have substantial views of the sky, with a given base GPS receiver having a substantial view of at least a portion of the sky, the plurality of base GPS receivers producing range data;
   a plurality of fixed-position GPS receivers operating in locations in which at various times the signals from GPS satellites in certain sky locations are unavailable, weakened or corrupted by multipath at the one or more slave GPS receivers, the slave GPS receivers producing associated range data; and
   a data recording and control center for
      collecting the range data from the base GPS receivers and the fixed-position receivers over an extended period of time and batch processing the information to determine as valid respective range data that corresponds to intervals in which there are continuity of carrier phase measurements and no perceived movement and calculate positions of the respective fixed-position GPS receivers using the valid range data, and recording the positions of the respective fixed-position receivers.

8. The system of claim 7 wherein the data recording and control center returns the calculated positions to the respective fixed-position GPS receivers.

9. The system of claim 8 wherein the fixed-position receivers use the calculated positions to acquire and track the satellite signals.

10. A method including:
    acquiring and tracking satellite signals and producing range data at one or more fixed-position locations using receivers that are configured to acquire and track satellite signals, with one or more of the locations having restricted views of the sky;
    acquiring and tracking satellite signals and producing range data from one or more base locations that have substantially clear views of at least respective portions of the sky using receivers that are configured to acquire and track satellite signals;
    collecting, using one or more processors at a data recording and control center, the range information from the fixed-position locations and the base locations over an extended period of time and batch processing the information to determine valid range data and calculate the positions of the respective fixed-position locations using the valid range data; and
    storing the calculated positions.

11. The method of claim 10 further including
    returning the calculated positions to the respective fixed-position locations; and
    at the respective locations utilizing the calculated positions to acquire and track satellite signals.

12. The method of claim 10 wherein the step of batch processing includes determining that respective range data that correspond to perceived movement are invalid.

13. The method of claim 10 wherein the step of batch processing includes using calculations involving carrier phase measurements.

14. The method of claim 10 wherein the step of batch processing uses range data from the one or more base locations in double difference calculations.

15. The method of claim 10 wherein the step of batch processing utilizes range data accumulated over intervals in which there is continuity in the carrier phase measurements and determines the respective range data are invalid over a given interval if the range data are associated with perceived movement.

16. A method including:
    acquiring and tracking satellite signals and producing range data at one or more fixed-position locations using receivers that are configured to acquire and track satellite signals, with one or more of the locations having restricted views of the sky;
    acquiring and tracking satellite signals and producing range data from one or more base locations that have substantially clear views of at least respective portions of the sky using receivers that are configured to acquire and track satellite signals;
    collecting, using one or more processors at a data recording and control center, the range information from the fixed-position locations and the base locations over an extended period of time and batch processing the information to determine as valid respective range data that correspond to intervals in which there are continuity of carrier phase measurements and no perceived movement and calculate positions of the respective fixed-position locations using the valid range data; and
    storing the calculated positions.

17. The method of claim 16 further including returning the calculated positions to the respective fixed-position locations, and at the respective fixed-position locations utilizing the calculated positions to aid in acquiring and tracking satellite signals.

\* \* \* \* \*

UNITED STATES PATENT AND TRADEMARK OFFICE
CERTIFICATE OF CORRECTION

PATENT NO. : 7,668,657 B2  
APPLICATION NO. : 11/835520  
DATED : February 23, 2010  
INVENTOR(S) : Patrick C. Fenton It is certified that error appears in the above-identified patent and that said Letters Patent is hereby corrected as shown below:

Delete the title page and substitute therefore the attached title page consisting of corrected illustrative figure.

Signed and Sealed this
Eighteenth Day of January, 2011

David J. Kappos
*Director of the United States Patent and Trademark Office*

United States Patent
Fenton

(10) Patent No.: US 7,668,657 B2
(45) Date of Patent: *Feb. 23, 2010

(54) SEISMIC MEASURING SYSTEM INCLUDING GPS RECEIVERS

(75) Inventor: Patrick C. Fenton, Calgary (CA)

(73) Assignee: NovAtel Inc., Calgary, Alberta (CA)

(*) Notice: Subject to any disclaimer, the term of this patent is extended or adjusted under 35 U.S.C. 154(b) by 0 days.

This patent is subject to a terminal disclaimer.

(21) Appl. No.: 11/835,520

(22) Filed: Aug. 8, 2007

(65) Prior Publication Data

US 2007/0268176 A1 Nov. 22, 2007

Related U.S. Application Data

(63) Continuation of application No. 11/502,086, filed on Aug. 10, 2006, now Pat. No. 7,526,386, which is a continuation of application No. 10/891,800, filed on Jul. 15, 2004, now Pat. No. 7,117,094.

(51) Int. Cl.
*G01V 1/00* (2006.01)
*G01S 1/00* (2006.01)

(52) U.S. Cl. .................................. 702/14; 342/357.12
(58) Field of Classification Search .................. 702/14, 702/5, 16, 1, 2, 150-153, 155, 158, 159; 340/686.1, 690, 540; 342/118, 125, 127, 342/352, 357.01, 357.06, 357.09, 357.12, 342/357.15, 128, 357.04, 357.16, 358
See application file for complete search history.

(56) References Cited

U.S. PATENT DOCUMENTS

| | | | |
|---|---|---|---|
| 4,589,100 A | | 5/1986 | Savit |
| 4,894,662 A | * | 1/1990 | Counselman ........ 342/357.12 |
| 5,252,982 A | * | 10/1993 | Frei ................... 342/357.03 |
| 5,552,794 A | * | 9/1996 | Colley et al. ........ 342/357.05 |
| 5,583,513 A | * | 12/1996 | Cohen ................. 342/357.06 |

(Continued)

FOREIGN PATENT DOCUMENTS

WO  WO 01/55747 A1  8/2001

(Continued)

OTHER PUBLICATIONS

Duff et al., Structural Deformation Monitoring With GPS. Operational Issues, 1998, SPIE vol. 3400, pp. 422-432.*

(Continued)

*Primary Examiner*—Michael P. Nghiem
*Assistant Examiner*—Toan M Le
(74) *Attorney, Agent, or Firm*—Cesari and McKenna, LLP; Patricia A. Sheehan

(57) ABSTRACT

A system for determining positions of fixed-position GPS receives that have restricted views of the sky includes a data recording and control center, and one or more base GPS receivers with associated antennas with a substantially unrestricted views of the sky. The system batch processes range information provided by the fixed-position GPS receivers over an extended period of time; determining which of the range data from the fixed-position receivers are valid, and using the valid range data to determine position. In this way, the precise positions of the respective fixed-position slave GPS receivers can be calculated, even if the fixed-position GPS receivers are able to observe and collect data from sets of two or more satellites for only three or four relatively short time intervals at various sky positions during the extended period.

17 Claims, 2 Drawing Sheets